US010452551B2

(12) United States Patent
Venkatesh et al.

(10) Patent No.: US 10,452,551 B2
(45) Date of Patent: Oct. 22, 2019

(54) PROGRAMMABLE MEMORY PREFETCHER FOR PREFETCHING MULTIPLE CACHE LINES BASED ON DATA IN A PREFETCH ENGINE CONTROL REGISTER

(71) Applicant: Intel Corporation, Santa Clara, CA (US)

(72) Inventors: Ganesh Venkatesh, Portland, OR (US); Christopher B. Wilkerson, Portland, OR (US); Seth H. Pugsley, Hillsboro, OR (US); Deborah T. Marr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/376,242

(22) Filed: Dec. 12, 2016

(65) Prior Publication Data

US 2018/0165204 A1 Jun. 14, 2018

(51) Int. Cl.
*G06F 12/08* (2016.01)
*G06F 9/30* (2018.01)
*G06F 12/0862* (2016.01)

(52) U.S. Cl.
CPC ...... *G06F 12/0862* (2013.01); *G06F 9/30047* (2013.01); *G06F 2212/602* (2013.01);
(Continued)

(58) Field of Classification Search
CPC ........... G06F 12/0862; G06F 2212/602; G06F 2212/6022; G06F 2212/6024;
(Continued)

(56) References Cited

U.S. PATENT DOCUMENTS 5,802,569 A * 9/1998 Genduso ............... G06F 9/3802
711/137
5,854,934 A * 12/1998 Hsu ....................... G06F 8/4442
711/118

(Continued)

*Primary Examiner* — Glenn Gossage
(74) *Attorney, Agent, or Firm* — Alliance IP, LLC

(57) ABSTRACT

A processor may include a programmable memory prefetcher that includes a programmable hardware prefetch engine and a prefetch engine control register. The programmable memory prefetcher may include circuitry and may be configured to receive, during execution of an application, a first instruction for configuring the prefetch engine for prefetching multiple cache lines to be accessed in the future, at predictable locations, by the application; to store, in the prefetch engine control register, dependent on information in the first instruction, data representing an amount of prefetching to be performed, and data representing a stride distance between consecutive cache lines to be prefetched; to receive a second instruction for prefetching a single cache line whose location is identified in the second instruction; and to initiate, in response to receiving the second instruction, prefetching of multiple cache lines by the prefetch engine, to be performed in parallel with execution of the application and in accordance with the data stored in the prefetch engine control register. The prefetch engine control register may store multiple entries, each including an identifier of a given operation to prefetch multiple cache lines. An instruction may also be received to disable prefetching of multiple cache lines. The multiple cache lines may be prefetched from a last-level cache (LLC) to a mid-level cache.

18 Claims, 17 Drawing Sheets

(52) U.S. Cl.
CPC ............... *G06F 2212/6026* (2013.01); *G06F 2212/6028* (2013.01)

(58) Field of Classification Search
CPC ..... G06F 2212/6026; G06F 2212/6028; G06F 9/30047
See application file for complete search history.

(56) References Cited

U.S. PATENT DOCUMENTS

| | | | | |
|---|---|---|---|---|
| 6,785,772 | B2* | 8/2004 | Venkumahanti | G06F 9/383 711/128 |
| 6,981,099 | B2* | 12/2005 | Paulraj | G06F 9/345 711/113 |
| 7,177,985 | B1* | 2/2007 | Diefendorff | G06F 12/0862 711/118 |
| 9,098,418 | B2* | 8/2015 | Kannan | G06F 12/0862 |
| 2003/0079089 | A1* | 4/2003 | Barrick | G06F 12/0862 711/137 |
| 2008/0091922 | A1* | 4/2008 | Fluhr | G06F 12/0862 712/207 |
| 2009/0198965 | A1* | 8/2009 | Arimilli | G06F 9/30043 712/207 |
| 2014/0189249 | A1* | 7/2014 | Ye | G06F 12/0862 711/137 |
| 2015/0143057 | A1* | 5/2015 | Pavlou | G06F 12/02 711/137 |
| 2017/0060751 | A1* | 3/2017 | Okawara | G06F 12/0862 |
| 2017/0161195 | A1* | 6/2017 | Henry | G06F 9/3802 |

* cited by examiner

PROGRAMMABLE MEMORY PREFETCHER FOR PREFETCHING MULTIPLE CACHE LINES BASED ON DATA IN A PREFETCH ENGINE CONTROL REGISTER

FIELD OF THE INVENTION

The present disclosure pertains to the field of processing logic, microprocessors, and an associated instruction set architecture that, when executed by a processor or other processing logic, perform logical, mathematical, or other functional operations, such as multiple cache line prefetching operations.

DESCRIPTION OF RELATED ART

Multiprocessor systems are becoming more and more common. In order to take advantage of multiprocessor systems, code to be executed may be separated into multiple threads for execution by various processing entities. Each thread may be executed in parallel with one another. Pipelining of applications may be implemented in systems in order to more efficiently execute applications. Instructions as they are received on a processor may be decoded into terms or instruction words that are native for execution on the processor. Each processor may include a cache or multiple caches. Processors may be implemented in a system on chip (SoC).

DESCRIPTION OF THE FIGURES

Various embodiments of the present disclosure are illustrated by way of example and not limitation in the Figures of the accompanying drawings, in which like references indicate similar elements, and in which.

DETAILED DESCRIPTION

Figure 1A:
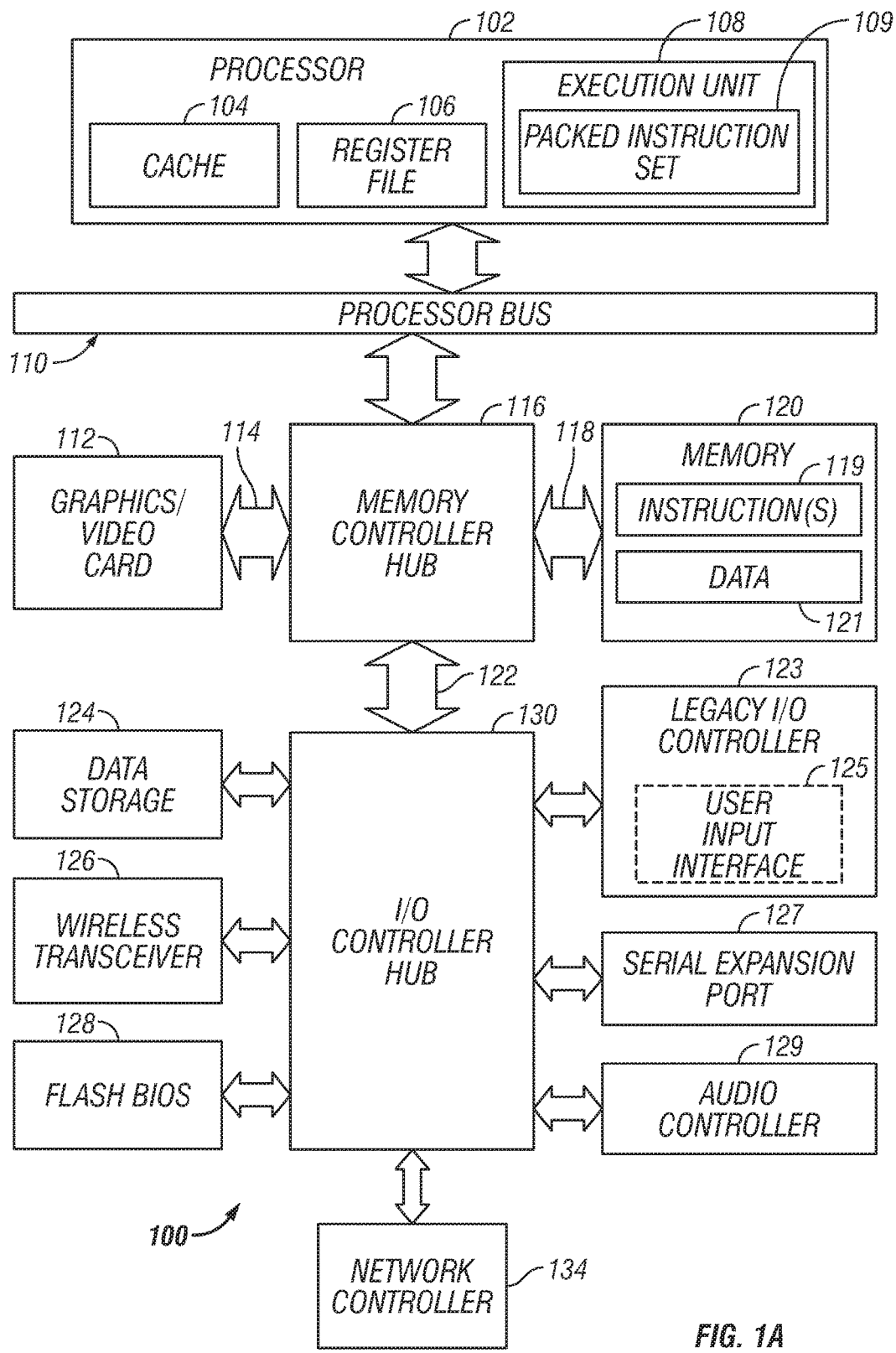
FIG. 1A is a block diagram of an exemplary computer system formed with a processor that may include execution units to execute an instruction, in accordance with embodiments of the present disclosure.

The following description describes instructions and processing logic for implementing multiple cache line prefetching in a processing apparatus using a programmable memory prefetcher that includes a programmable hardware prefetch engine. Such a processing apparatus may include an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that other embodiments may be practiced without such specific details. Additionally, some well-known structures, circuits, and the like have not been shown in detail to avoid unnecessarily obscuring the example embodiments of the present disclosure included herein.

References in the specification to "one embodiment," "an embodiment," "an example embodiment," etc., indicate that the embodiment described may include a particular feature, structure, or characteristic. However, not all embodiments of the present disclosure necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to affect such a feature, structure, or characteristic in connection with other embodiments of the disclosure, whether or not such a connection is explicitly described.

Although some example embodiments are described with reference to a processor, other embodiments may be applicable to other types of integrated circuits and logic devices. Similar techniques and teachings of various embodiments of the present disclosure may be applied to other types of circuits or semiconductor devices that may benefit from higher pipeline throughput and improved performance. The teachings of the example embodiments of the present disclosure may be applicable to any processor or machine that performs data manipulations. However, other embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the examples below describe instruction handling and distribution in the context of execution units and logic circuits, other embodiments of the present disclosure may be accomplished by way of data or instructions stored on a machine-readable, tangible medium, which when executed by a machine cause the machine to perform functions in accordance with at least one embodiment of the disclosure. In some embodiments, functions described in the present disclosure may be embodied in machine-executable instructions. The instructions may be used to cause a general-purpose or special-purpose processor that may be programmed with the instructions to perform the operations of the present disclosure. Some embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, operations of some embodiments of the present disclosure might be performed by specific hardware components that contain fixed-function logic for performing the operations, or by any combination of programmed computer components and fixed-function hardware components. Throughout this disclosure, unless explicitly stated otherwise, a compound form of a reference numeral refers to the element generically or collectively. Thus, for example, widget 101A or 101-1 refers to an instance of a widget class, which may be referred to collectively as widgets 101 and any one of which may be referred to generically as widget 101.

Instructions used to program logic to perform some embodiments of the present disclosure may be stored within a memory in the system, such as dynamic random access memory (DRAM), cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store information on a tangible, machine-readable medium, at least temporarily, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS™, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed.

In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., two-dimensional (2D)/three-dimensional (3D) graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may be a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS™ processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination register.

FIG. 1A is a block diagram of an exemplary computer system formed with a processor that may include execution units to execute an instruction, in accordance with some embodiments of the present disclosure. System 100 may include a component, such as a processor 102, to employ execution units including logic to perform algorithms for processing data, in accordance with the present disclosure, such as in the example embodiments described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including personal computers (PCs) having other microprocessors, engineering workstations, set-top boxes and the like) may also be used. In one embodiment, sample system 100 may execute a version of the WINDOW S™ operating system available from Microsoft Corporation of Redmond, Wash., although other operating systems (UNIX and Linux™ for example), embedded software, and/or graphical user interfaces, may also be used. Thus, embodiments of the present disclosure are not limited to any specific combination of hardware circuitry and software.

Embodiments of the present disclosure are not limited to computer systems. Some embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip (SoC), network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer registers.

Execution unit 108, including logic to perform integer and floating point operations, also resides in processor 102. Processor 102 may also include a microcode (ucode) ROM (not shown) that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Some embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instruction(s) 119 and/or data 121 represented by data signals that may be executed by processor 102.

A system logic chip, such as a memory controller hub (MCH) 116, may be coupled to processor bus 110 and memory 120. Processor 102 may communicate with MCH 116 via a processor bus 110. MCH 116 may provide a high bandwidth memory interface 118 to memory 120 for storage of instruction(s) 119 and data 121 and for storage of graphics commands, data and textures. MCH 116 may direct data signals between processor 102, memory 120, and other components in system 100 to bridge the data signals between processor bus 110, memory 120, and system I/O interface bus 122. In some embodiments, the MCH 116 may provide a graphics port for coupling to a graphics/video card 112. MCH 116 may be coupled to memory 120 through a memory interface 118. Graphics/video card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, MCH 116, and processor 102. Examples may include the audio controller 129, firmware hub (flash basic input output system (BIOS)) 128, wireless transceiver 126, data storage 124, legacy I/O controller 123 containing user input interface 125 (which may include a keyboard interface), a serial expansion port 127 such as Universal Serial Bus (USB), and a network controller 134. Data storage device 124 may comprise a hard disk drive, a floppy disk drive, a compact disc-read only memory (CD-ROM) device, a flash memory device, or other mass storage device.

In another example system, an instruction in accordance with one embodiment may be used with a system on a chip (SoC). One embodiment of a system on a chip comprises a processor and a memory. The memory for one such system may include a flash memory. The flash memory may be located on the same die as the processor and other system components. Additionally, other logic blocks such as a memory controller or graphics controller may also be located on a system on a chip (SoC).

Figure 1B:
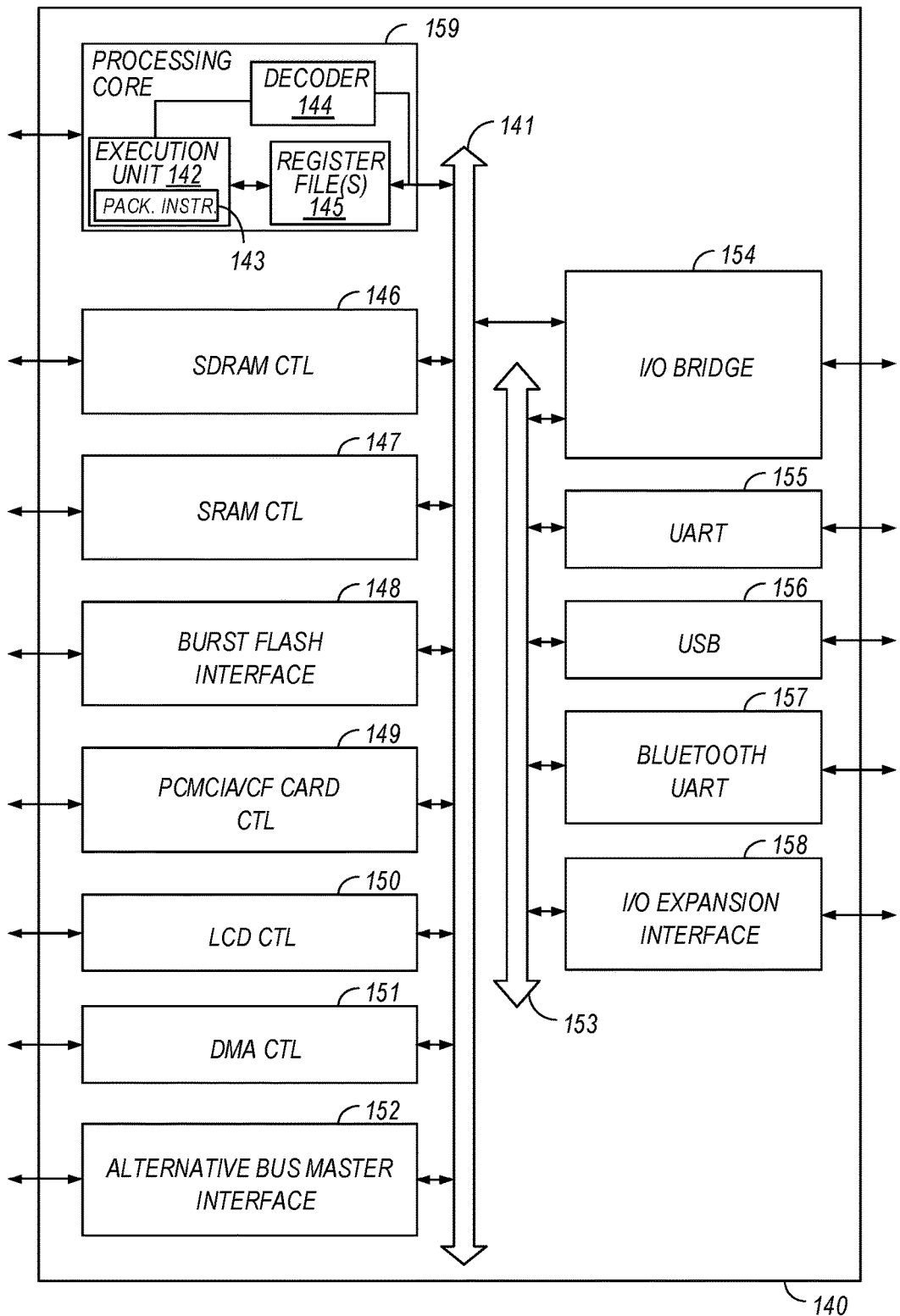
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and, by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. The storage area may store packed data that might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF®) card control 149, liquid crystal display (LCD) control 150, direct memory access (DMA) controller 151, and alternate bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
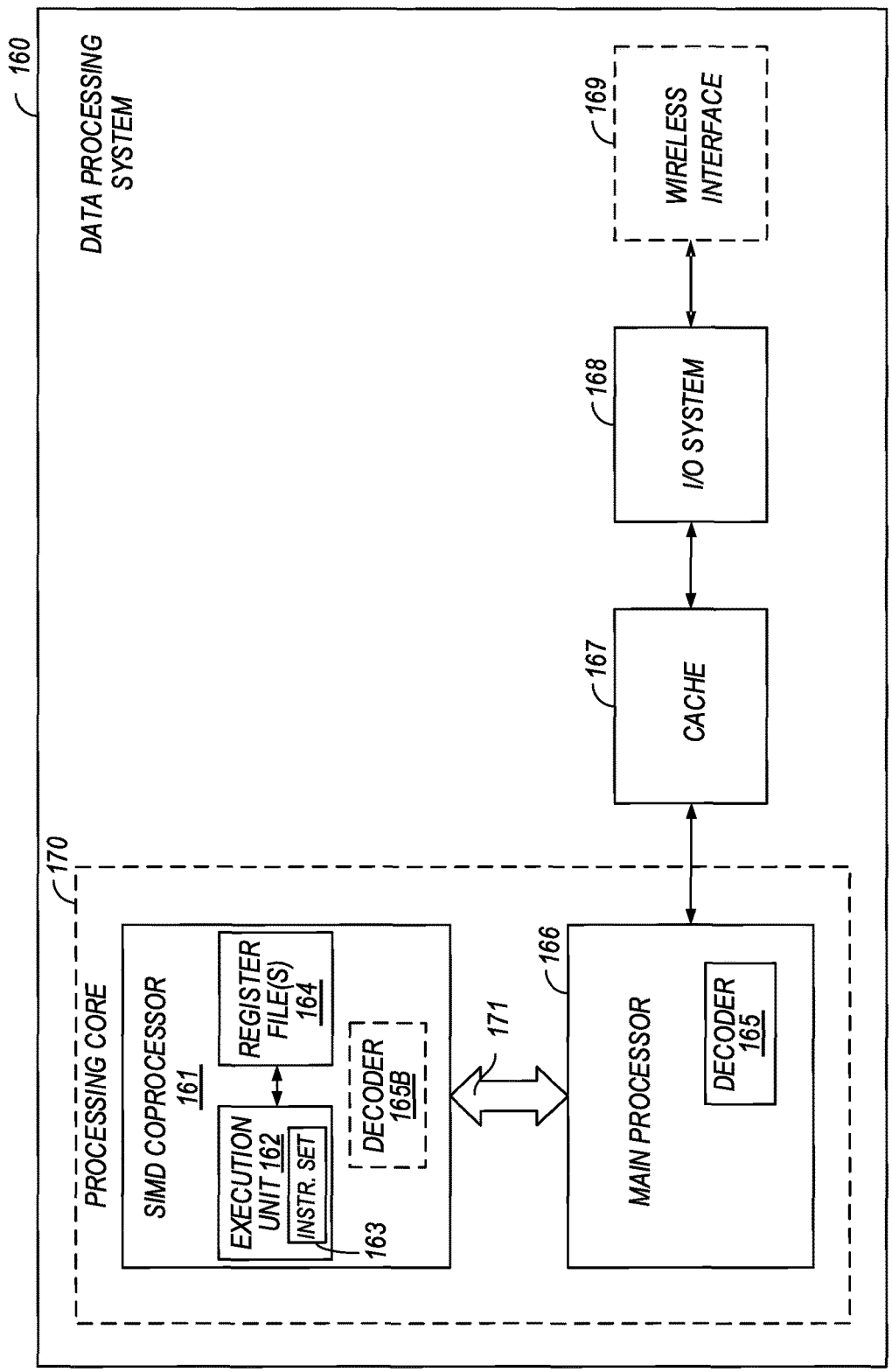
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations, including executing instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 (shown as 165B) to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 171. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Some processors include hardware prefetchers that attempt to predict what data will be needed in an executing application and to prefetch that data ahead of time. For example, a stream prefetcher may monitor the instruction stream in search of sequences of consecutive cache lines that are accessed by the executing application. However, it is often the case, especially for certain types of workloads, that any streams that exist in the code are so short that the stream prefetcher cannot warm up on them in time to make prefetching work well.

In situations in which the pattern of cache line accesses is known, software prefetch instructions can be inserted into the code such that the next cache line to be accessed is prefetched while a current cache line is being consumed. However, for some workloads, this approach is not very effective. For example, analytic and data-mining workloads typically exhibit highly regular, easy to prefetch address patterns from the software perspective, but are nonetheless unable to take full advantage of the memory system. The typical access pattern for these workloads includes many short bursts (e.g., 500 Bytes-4 KB) of sequential address accesses that should ideally exhibit high row buffer locality. However, in many cases these workloads are unable to efficiently use the memory subsystem due to initial memory access latency, wasted prefetches beyond an array's end address, the loss of the sequential behavior of the requests as they travel through the memory pipeline from the mid-level cache to the memory controller, and/or queueing constraints at the miss status handling registers (MSHRs) in the level one (L1) cache that become a bottleneck, preventing the passage of prefetch requests to memory.

In some embodiments of the present disclosure, the use of a software controlled mechanism to control a dedicated programmable hardware prefetch engine may provide for greater control over the timing and extent of prefetch requests in a processor. More specifically, a processor may include a programmable hardware prefetch engine at the last-level cache or at the mid-level cache that is programmed by the application software. In at least some embodiments, application software may set a parameter value stored in a control register to a value representing the length of the array it wants to prefetch. In some embodiments, the programmable hardware prefetch engine may use this control register value, along with an existing software prefetch instruction, to fetch data from a last-level cache into the mid-level cache. In some embodiments, the programmable hardware prefetch engine may use this control register value, along with an existing software prefetch instruction, to fetch data from a system agent, such as the uncore module of Intel® processors, into the mid-level cache.

In some embodiments, control over the prefetching may be achieved through two mechanisms. For example, coarse grained control may be achieved through the use of a prefetch engine control register, while fine grained control may be achieved through the use of software prefetch instructions. This combination of mechanisms may be beneficial since prefetching patterns in real workloads can vary significantly, even within a single workload. In a sparse matrix data structure, for example, the optimal number of prefetch requests will depend on the size of the sequential nodes, and the sizes of these nodes will vary. In at least some embodiments, the prefetch engine control register may be configured to enable, disable, and control general prefetch state machine parameters for a multiple cache line prefetching operation, while the software prefetch instructions may be used to specify where and how many prefetches should be issued.

In some embodiments, this combined approach may allow the system to avoid the warm up time associated with a stream prefetcher because the programmable hardware prefetch engine can start issuing prefetch requests based on receipt of a single software prefetch instruction. This approach may also allow the system to avoid wasting bandwidth because the software specifies the amount of data (or the number of cache lines) to be prefetched ahead of time. Thus, the programmable hardware prefetch engine, unlike the traditional stream prefetcher, will not prefetch beyond the end of the specified prefetching range. In some embodiments, this combined mechanism may be implemented deep in the memory pipeline, at either the mid-level cache or the last-level cache, to avoid queuing constraints closer to the processor core. In some embodiments, these mechanisms may take advantage of available super queue entries in the mid-level cache to fetch data to the cache in a timely manner. These mechanisms have been shown to provide significant performance and power improvements for workloads that exhibit sequential access patterns. For example, initial limit studies show that, for at least some workloads, this approach can provide 1.2-2.5× performance improvement while reducing the number of DRAM accesses by up to 50%.

Figure 2:
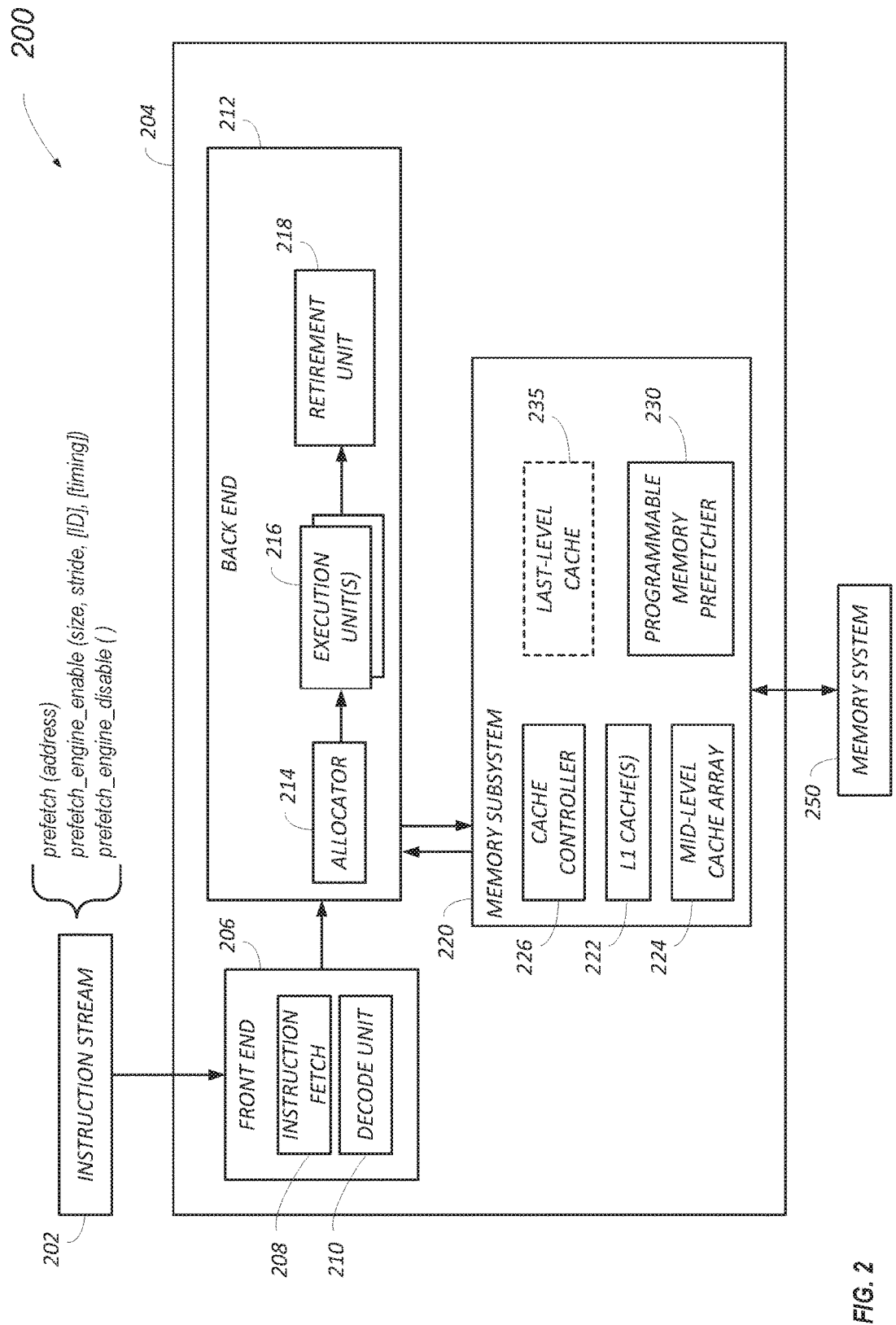
FIG. 2 is a block diagram illustrating an example system including a programmable memory prefetcher, according to some embodiments of the present disclosure.

Embodiments of the present disclosure involve instructions and processing logic for implementing multiple cache line prefetching using a programmable memory prefetcher. FIG. 2 is a block diagram illustrating an example system 200 including a programmable memory prefetcher, according to some embodiments of the present disclosure. System 200 may include a processor, SoC, integrated circuit, or other mechanism. For example, system 200 may include a processor core 204. Although processor core 204 is shown and described as an example in FIG. 2, any suitable mechanism may be used. Processor core 204 may include any suitable mechanisms for prefetching multiple cache lines that are to be accessed by an application asynchronously and in parallel with the execution of the application, including those that involve the use of a programmable memory prefetcher. In one embodiment, such mechanisms may be implemented in hardware. Processor core 204 may be implemented fully or in part by the elements described in FIGS. 1A-1C or in FIGS. 7A-14.

Instructions to be executed on processor core 204 may be included in instruction stream 202. Instruction stream 202 may be generated by, for example, a compiler, just-in-time interpreter, or other suitable mechanism (which might or might not be included in system 200), or may be designated by a drafter of code resulting in instruction stream 202. For example, a compiler may take application code and generate executable code in the form of instruction stream 202. Instructions may be received by processor core 204 from instruction stream 202. Instruction stream 202 may be loaded to processor core 204 in any suitable manner. For example, instructions to be executed by processor core 204 may be loaded from storage, from other machines, or from other memory, such as memory system 250. The instructions may arrive and be available in resident memory, such as RAM, and may be fetched from storage to be executed by processor core 204. The instructions may be fetched from resident memory by, for example, a prefetcher or fetch unit (such as programmable memory prefetcher 230 or instruction fetch unit 208). As illustrated in FIG. 2, in some embodiments, instruction stream 202 may include a prefetch instruction, a prefetch_engine_enable instruction, or a prefetch_engine_disable instruction. In some embodiments, the prefetch_engine_enable instruction and/or the prefetch_engine_disable instruction may be implemented as compiler directives, hints to a just-in-time interpreter, or similar, rather than as instructions within the native instruction set of the processor core. In some such embodiments, data representing these instructions may be inserted into instruction stream 202 as one or more undecoded native instructions or decoded instructions (uops) that perform write operations targeting a programmable hardware prefetch engine within programmable memory prefetcher 230.

Processor core 204 may include a front end 206 and a back end 212. Front end 206 may include an instruction fetch pipeline stage (such as instruction fetch unit 208) and a decode pipeline stage (such as decode unit 210). Front end 206 may receive and decode instructions from instruction stream 202 using decode unit 210. The decoded instructions may be dispatched, allocated, and scheduled for execution by an allocation stage of back end 212 (such as allocator 214) and allocated to specific execution units 216 within back end 212 for execution. One or more specific instructions to be executed by processor core 204 may be included in a library defined for execution by processor core 204. In another embodiment, specific instructions may be targeted by particular portions of processor core 204. For example, processor core 204 may recognize an attempt in instruction stream 202 to execute a vector operation in software and may issue the instruction to a particular one of execution units 216 to execute the instruction. In yet another embodiment, programmable memory prefetcher 230 within processor core 204 may recognize a prefetch instruction within instruction stream 202 and may, if configured to do so, prefetch multiple cache lines ahead of when they will be accessed by the executing code.

In one embodiment, system 200 may include a memory hierarchy comprising one or more levels of caches within the cores, one or more shared cache units, and/or external memory coupled to a set of integrated memory controller units (not shown). The caches on each level within the memory hierarchy may include any suitable caches. Some embodiments of the present disclosure may include a single internal cache for both instructions and data, such as, for example, a Level 1 (L1) internal cache, or multiple levels of internal cache. Other embodiments may include separate instruction and data cache units and a shared mid-level cache, such as a Level 2 (L2) cache unit. In some embodiments, the system may include a combination of an internal cache and an external cache that may be external to the core and/or the processor. For example, in some embodiments, a last-level cache (LLC), or at least a portion thereof, may reside in, or be local to, a particular core. In other embodiments. a last-level cache (LLC) may reside in a system agent or uncore module. In still other embodiments, all of the caches may be external to the core and/or the processor.

In the example system 200 illustrated in FIG. 2, memory subsystem 220 may include memory, RAM, or a cache hierarchy, which may include one or more Level 1 (L1) caches 222. In one embodiment, L1 caches 222 may be the closest elements of the memory hierarchy to the execution units 216. Therefore, accesses to the L1 caches 222 may experience the shortest latency compared to accesses to other levels in the memory hierarchy. In one embodiment, the L1 caches 222 may be smaller than the caches at other levels in the memory hierarchy. Memory subsystem 220 may also include, for example, a mid-level cache array 224. In one embodiment, mid-level cache array 224 may include one or more Level 2 (L2) caches. One or more L2 caches may be shared by multiple processor cores 204. In another embodiment, mid-level cache array 224 may include one or more caches on each of multiple levels in the cache hierarchy, such as level 2 (L2), level 3 (L3), level 4 (L4), or other levels of cache. In one embodiment, the caches of mid-level cache array 224 may be farther from the execution units 216 than the L1 caches 222, but closer to the execution units 216 than last-level cache 235. Therefore, accesses to the caches of mid-level cache array 224 may experience a longer latency than accesses to the L1 caches 222. In one embodiment, the caches of mid-level cache array 224 may be larger than the L1 caches 222, but may be smaller than last-level cache 235. In one embodiment, accesses to last-level cache 235 may experience a longer latency than accesses to other levels of the cache hierarchy.

Memory subsystem 220 may also include a cache controller 226. Cache controller 226 may control the assignment of various L1 caches 222 and mid-level cache array 224 for the use of execution units 216 within back end 212. In at least some embodiments, cache controller 226 may include hardware circuitry or logic to control the insertion of cache lines into the L1 caches 222 and mid-level cache array 224 and the eviction of cache lines from the L1 caches 222 and mid-level cache array 224 in accordance with one or more cache replacement policies for the caches.

During execution, access to data or additional instructions (including data or instructions resident in memory system 250) may be made through memory subsystem 220. Moreover, results from execution may be stored in memory subsystem 220 and may subsequently be flushed to memory system 250. After execution by execution units 216, instructions may be retired by a writeback stage or retirement stage in retirement unit 218 within back end 212. Various portions of such execution pipelining may be performed by one or more processor cores 204.

Programmable memory prefetcher 230 may include a programmable hardware prefetch engine that is programmable by application software, e.g., by instructions included in instruction stream 202. Following this programming, the programmable hardware prefetch engine within programmable memory prefetcher 230 may be enabled to prefetch multiple cache lines from last-level cache 235 into mid-level cache array 224 ahead of when they will be accessed by the application code. The operation of a programmable memory prefetcher 230 and its programmable hardware prefetch engine are described in more detail below, according to some embodiments.

Figure 3:
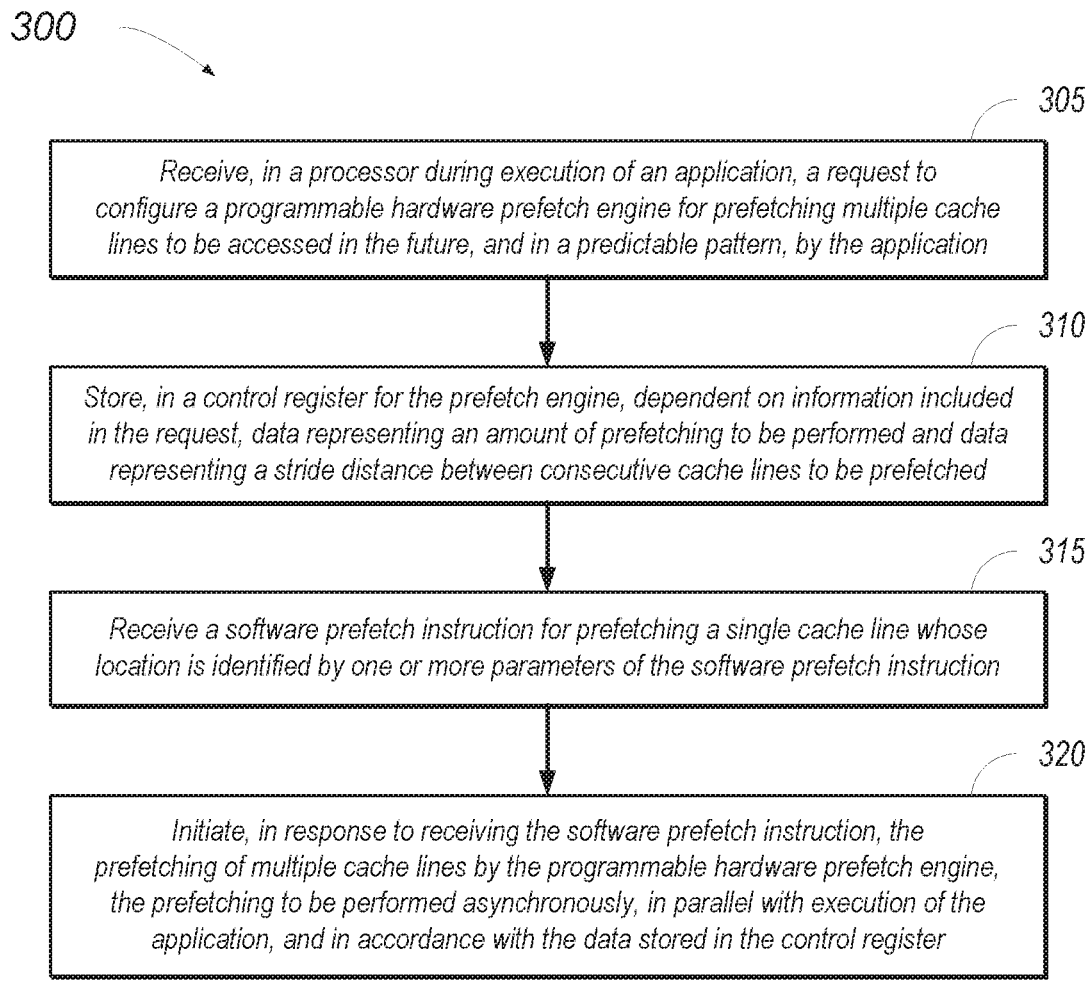
FIG. 3 is flow diagram illustrating a method for configuring and using a programmable hardware prefetch engine to prefetch multiple cache lines asynchronously and in parallel with the execution of an application that accesses those cache lines, according to some embodiments of the present disclosure.

FIG. 3 is flow diagram illustrating a method 300 for configuring and using a programmable hardware prefetch engine to prefetch multiple cache lines asynchronously and in parallel with the execution of an application that accesses those cache lines, according to some embodiments of the present disclosure. Method 300 may be implemented by one or more of the elements shown in FIGS. 1A-2, 4, or 7A-14. Method 300 may be initiated by any suitable criteria and may initiate operation at any suitable point. In one embodiment, method 300 may initiate operation at 305. Method 300 may include greater or fewer operations than those illustrated or described. Moreover, the operations of method 300 may be executed in an order different than those illustrated or described. Method 300 may terminate at any suitable operation. Moreover, method 300 may repeat operation at any suitable operation. Any operations of method 300 may be performed in parallel with other operations of method 300, or in parallel with operations of other methods. Furthermore, method 300 may be executed multiple times to configure and use a programmable hardware prefetch engine to prefetch multiple cache lines on behalf of executing code. In some embodiments, one or more additional methods, such as method 500 or method 600 described below, may be invoked during the execution of method 300 to perform some of the operations of method 300.

At 305, in one embodiment, a request to configure a programmable hardware prefetch engine for prefetching multiple cache lines to be accessed in the future, and in a predictable pattern, by an application, may be received in a processor during execution of the application. For example, a prefetch_engine_enable instruction may be received by the processor within an instruction stream. In various embodiments, the prefetch_engine_enable instruction may have been inserted into the instruction stream by a compiler, a just-in-time interpreter, or another suitable mechanism, or may have been designated by a drafter of the currently executing code (e.g., application code). In some embodiments, the programmable hardware prefetch engine may be an element of a programmable memory prefetcher, such as programmable memory prefetcher 230 illustrated in FIG. 2. In at least some embodiments, the programmable hardware prefetch engine may be implemented using hardware circuitry. In one embodiment, the programmable hardware prefetch engine may be a hardware state machine.

At 310, data representing an amount of prefetching to be performed by the programmable hardware prefetch engine and data representing a stride distance between consecutive cache lines to be prefetched by the programmable hardware prefetch engine may be stored in a control register for the programmable hardware prefetch engine, the data being dependent on information included in the request. For example, in various embodiments, a prefetch_engine_enable instruction may include parameters indicating the number of prefetches to be performed, the total size (e.g., in bytes) of the cache lines to be prefetched by the programmable hardware prefetch engine, and/or the distance (in terms of cache lines) between consecutive cache lines to the prefetched by the programmable hardware prefetch engine, as described above.

At 315, a software prefetch instruction for prefetching a single cache line whose location is identified by one or more parameters of the software prefetch instruction may be received within the instruction stream. For example, the software prefetch instruction may have been inserted into the instruction stream by a compiler, a just-in-time interpreter, or another suitable mechanism, or may have been designated by a drafter of the currently executing code (e.g., application code). At 320, in response to receiving the software prefetch instruction, the prefetching of multiple cache lines by the programmable hardware prefetch engine may be initiated. The prefetching may be performed asynchronously, in parallel with execution of the application, and in accordance with the data stored in the prefetch engine control register. For example, the programmable hardware prefetch engine may begin by prefetching a cache line at a distance from the location identified in the software prefetch instruction that is specified by the stride distance value stored in the stored in the prefetch engine control register for the programmable hardware prefetch engine. The programmable hardware prefetch engine may continue to prefetch additional cache lines, each at a distance from the most recently prefetched cache line specified by the stride distance value, until the total number of cache lines, or the total amount of cache line data, specified by a value stored in the prefetch engine control register for the programmable hardware prefetch engine, has been prefetched.

Figure 4:
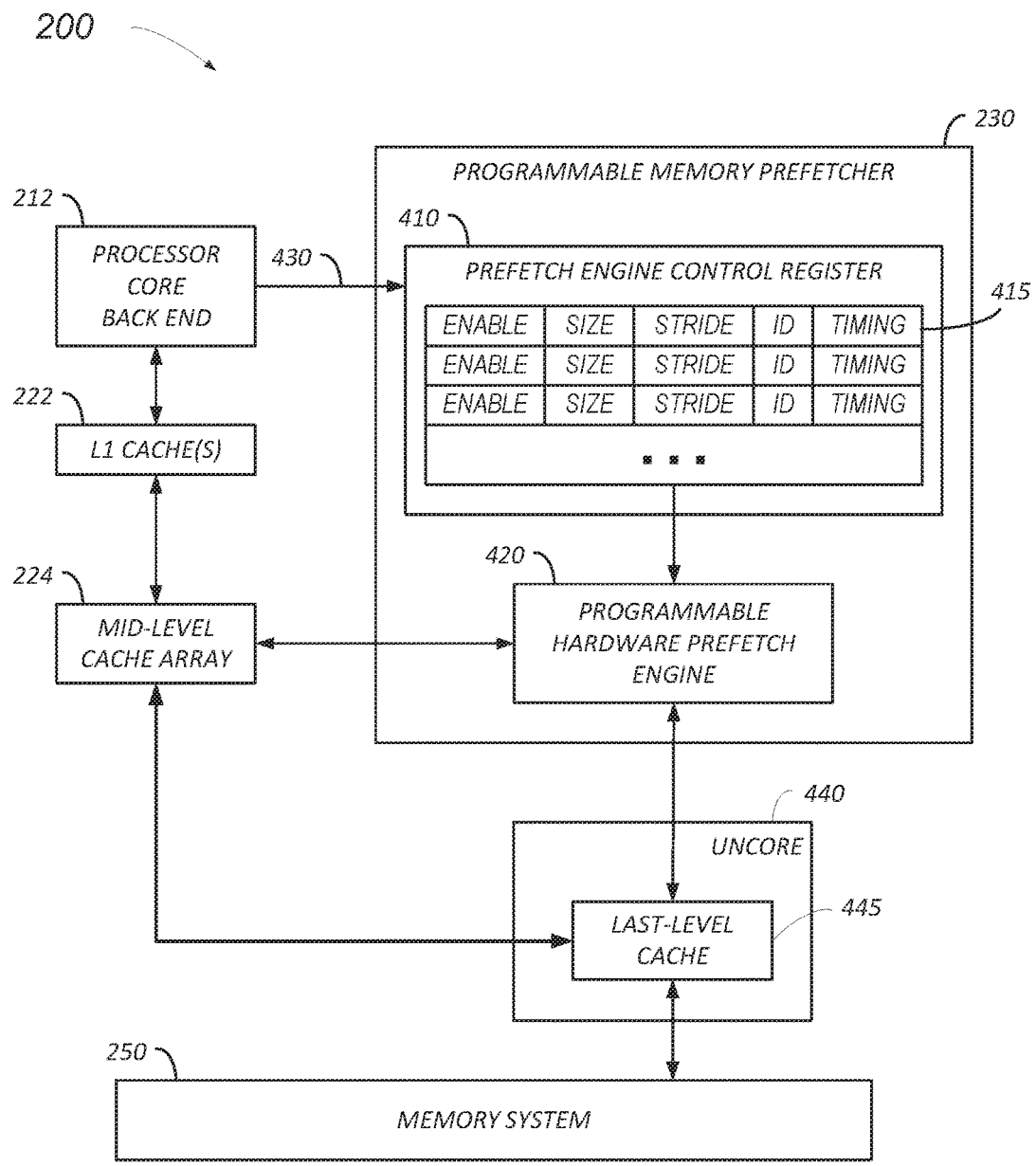
FIG. 4 is a block diagram illustrating selected portions of processor illustrated in FIG. 2 in more detail, according to some embodiments of the present disclosure.

FIG. 4 is a block diagram illustrating selected portions of the system 200 and processor core 204 shown in FIG. 2 in more detail, according to some embodiments of the present disclosure. In at least some embodiments, processor core 204 or system 200 may include an uncore module 440, which may include a last-level cache 445. In one embodiment, uncore module 440 may also include portions or subsystems of processor core 204 or system 200 necessary for the execution of instructions that are not implemented within the processor core back end 212. For example, in different embodiments, uncore module 440 may include one or more hardware interfaces, memory coherency coordinators, interprocessor interconnects, instruction pipelines, or memory controllers (not shown). Uncore module 440 may also be referred to as a system agent.

In some embodiments, in response to requests to perform prefetching into last-level cache 445, circuitry or logic within uncore module 440 may prefetch one or more cache lines from memory system 250 into last-level cache 445. In some embodiments, in response to requests to perform prefetching into mid-level cache array 224, if the targeted cache line has already been prefetched into last-level cache 445, circuitry or logic within uncore module 440 may promote one or more cache lines, including the targeted cache line, into mid-level cache array 224. If the targeted cache line has not already been prefetched into last-level cache 445, circuitry or logic within uncore module 440 may prefetch one or more cache lines, including the targeted cache line, from memory system 250 into last-level cache 445, after which they may be promoted to mid-level cache array 224.

In at least some embodiments, programmable memory prefetcher 230 may include a prefetch engine control register 410 and a programmable hardware prefetch engine 420. Prefetch engine control register 410 may include multiple entries 415. Each entry 415 may store data representing the total size of the cache lines to be prefetched (e.g., in bytes) or the total number of cache line prefetches to be performed during a multiple cache line prefetching operation (shown as a "SIZE" field). In one embodiments, the maximum size that can be represented in this field is 4 KB (12 bits), which may correspond to the page size. In some embodiments, the size field may include an optional bit to specify full page prefetching.

Each entry 415 may also include data representing a stride distance between the cache lines to be prefetched (shown as a "STRIDE" field). In some embodiments, the default value of the stride field may be 1, indicating that each successive cache line that is prefetched will be the next cache line on the page, and that no cache lines in-between will be skipped. A value of 2 in the stride field may indicate every other cache line should be prefetched, while a value of 3 in the stride field may indicate that every third cache line should be prefetched, and so on. Each entry 415 may also include a multiple cache line prefetching operation enable indicator (shown as an "ENABLE" field). The value stored in the enable field may indicate whether or not the programmable hardware prefetch engine 420 is enabled to prefetch multiple cache lines ahead of when they will be accessed by the currently executing code.

In some embodiments, each entry 415 may include an operation identifier (shown as an "ID" field), in order to support multiple outstanding prefetch streams. For example, depending on the number of bits in the operation identifier field, the programmable hardware prefetch engine 420 may support, e.g., four different sets of parameters or eight different sets of parameters for respective multiple cache line prefetching operations. In some embodiments, some number of the lowest-order bits of the address specified by a software prefetch instruction (e.g., the bits specifying the physical page index) may be ignored, and the hardware state machine within the programmable hardware prefetch engine 420 may always start prefetching cache lines at the beginning of a page. In such embodiments, the remaining bits may be used to specify which of the state machines to use (e.g., from which entry 415 within prefetch engine control register 410 the state machine parameters will be obtained). In some embodiments, each entry 415 may also include timing information for the cache line prefetches (shown as a "TIMING" field). For example, the value stored in this field may specify the number of execution cycles to wait between consecutive prefetch requests by the programmable hardware prefetch engine 420.

Write requests 430, which target various entries 415 within prefetch engine control register 410, may be received by programmable memory prefetcher 230 from processor core back end 212. In some embodiments, these write requests 430 may be generated in response to receiving and decoding a prefetch_engine_enable instruction or a prefetch_engine_disable instruction within the instruction stream. In response to a write request corresponding to a prefetch_engine_enable instruction, parameters for controlling a particular multiple cache line prefetching operation may be stored in one of the entries 415 within prefetch engine control register 410. In addition, the value of the enable field in the entry 415 may be set to "1" to enable the programmable hardware prefetch engine 420 to perform the particular multiple cache line prefetching operation.

If and when, subsequent to enabling the programmable hardware prefetch engine 420 to perform the particular multiple cache line prefetching operation, a prefetch instruction is received at the mid-level cache array 224, hardware circuitry or logic within programmable hardware prefetch engine 420 may prefetch multiple cache lines from last-level cache 445 within uncore module 440 into mid-level cache array 224, in accordance with the parameters of a particular multiple cache line prefetching operation stored in an entry 415 of prefetch engine control register 410. In at least some embodiments, software prefetch instructions may behave in a manner similar to that of load instructions. For example, each software prefetch instruction is provided with an address, and it will prefetch the cache line in which that address resides, and only that one cache line. The software prefetch instruction may include an address that is essentially a memory request that targets the mid-level cache array 224. The software prefetch instruction may also include a bit to indicate that the instruction was a software prefetch, rather than a regular load.

In some embodiments, programmable hardware prefetch engine 420 may include a hardware state machine to perform the multiple cache line prefetching operation. When that instruction arrives at the mid-level cache array 224, the programmable hardware prefetch engine, which monitors all the requests that arrive at the mid-level cache, may detect that this is a software prefetch request. In response, it may start the hardware state machine that implements the functionality of the programmable hardware prefetch engine, may examine a prefetch engine control register to determine whether the programmable hardware prefetch engine is enabled to perform a multiple cache line prefetching operation and, if so, may operate the state machine according to the programmed state machine parameters found in the prefetch engine control register.

Subsequent to enabling the programmable hardware prefetch engine 420 to perform the particular multiple cache line prefetching operation, or subsequent to the programmable hardware prefetch engine 420 performing the particular multiple cache line prefetching operation, the programmable hardware prefetch engine 420 may receive a write request 430 representing a prefetch_engine_disable instruction. In response to this write request, the value of the enable field in the entry 415 within prefetch engine control register 410 may be set to "0" to disable the particular multiple cache line prefetching operation. In some embodiments, in response to a write request 430 representing a prefetch_engine_disable instruction, some or all of the other fields of the entry 415 may be cleared (e.g., their values may be set to all zeros).

The mechanisms described herein for performing multiple cache line prefetching operations may be further illustrated by the following example pseudo code. In the first listing below, the pseudo code is for performing a sparse vector-dense matrix reduction. The code accesses multiple memory locations at successive addresses that follow a predictable pattern and that reside on cache lines at a fixed stride distance apart.

```
1    void sparseVectorDenseMatrixProduct (float** denseClusterMatrix,
2                float* sparseVector,
3                int clusterCount)
4    {
5      float *sum = new float[clusterCount];
6
7      for (int i = 0; i < colCount; i++)
8      {
9        float sparseEntry = sparseVector[i];
10       float denseCluster = denseClusterMatrix[sparseVectorIndex[i]];
11
12       for (int j = 0; j < clusterCount; j++)
13       {
14         sum[j] += sparseEntry * denseCluster[j];
15       }
16     }
17
18     return (sum);
19   }
```

In the second pseudo code listing, shown below, the code has been modified to include a prefetch_engine_enable instruction (on line 6), a prefetch instruction (on line 11), and a prefetch_engine_disable instruction (on line 17).

```
1    void sparseVectorDenseMatrixProduct (float** denseClusterMatrix,
2                float* sparseVector,
3                int clusterCount)
4    {
5      float *sum = new float[clusterCount];
6      prefetch_engine_enable (clusterCount*sizeof(float), 1);
7      for (int i = 0; i < colCount; i++)
8      {
9        float sparseEntry = sparseVector[i];
10       float denseCluster = denseClusterMatrix[sparseVectorIndex[i]];
11       prefetch(denseClusterMatrix[sparseVectorIndex[i+1]]);
12       for (int j = 0; j < clusterCount; j++)
13       {
14         sum[j] += sparseEntry * denseCluster[j];
15       }
16     }
17     prefetch_engine_disable ( );
18     return (sum);
19   }
```

In this example, during each outer loop iteration, the program starts the prefetch stream for the next iteration using the software prefetch instruction on line 11. This effectively overlaps the data fetch for the next iteration with the computation of the current iteration. The programmable hardware prefetch engine uses the software prefetch instruction address as the starting point to run ahead and prefetch at least the next cluster column.

In this example, the prefetch_engine_enable instruction, on line 6, configures the programmable hardware prefetch engine parameters for a multiple cache prefetching operation to be performed by a programmable hardware prefetch engine, setting the prefetch array size and prefetch stride distance, and enabling the programmable hardware prefetch engine for use. More specifically, this instruction sets the value of an enable field in an entry in a prefetch engine control register to "true", sets the value of a size field in the entry to "clusterCount", and sets the value of a stride field in the entry to 1, indicating that each successive cache line that is prefetched will be the next cache line on the page, and no cache lines in-between will be skipped. The prefetch instruction, on line 11, starts the prefetching operation beginning at the next column, i.e., the column following the one being operated on by the original code. This triggers the programmable hardware prefetch engine to begin asynchronously prefetching multiple cache lines, in accordance with the settings written to the entry in the prefetch engine control register at line 6. The prefetch_engine_disable instruction, on line 17, disables the programmable hardware prefetch engine. More specifically, this instruction may clear the enable field of the entry in the prefetch engine control register and may also clear some or all of the values of the other fields of the entry, in some embodiments. Clearing at least the enable field may prevent another prefetch instruction that is received by the programmable hardware prefetch engine from performing a multiple cache line prefetching operation at the wrong time, beginning in the wrong location, and/or using the wrong parameter settings.

While not illustrated in the example pseudo code above, in some embodiments, the prefetch_engine_enable instruction may include one or more additional parameters. For example, it may include an operation identifier (in embodiments that support multiple outstanding prefetch streams) and/or timing information (such as an indication of the number execution cycles that the programmable hardware prefetch engine should wait between cache line prefetches). In another example, the prefetch_engine_enable instruction may include a parameter identifying a starting location for the multiple cache line prefetching operation.

In some embodiments, the programmable hardware prefetch engine may be configured such that is does not cross page boundaries when performing a multiple cache line prefetching operation. In such embodiments, the programmable hardware prefetch engine may stop prefetching if the end of the current page is encountered. In some embodiments, the compiler or interpreter that inserts the prefetch_engine_enable instructions may handle cases in which an array being traversed by the application code crosses a page boundary by issuing multiple requests for multiple cache line prefetching operations of appropriate sizes to cover the entire array, if needed.

Figure 5:
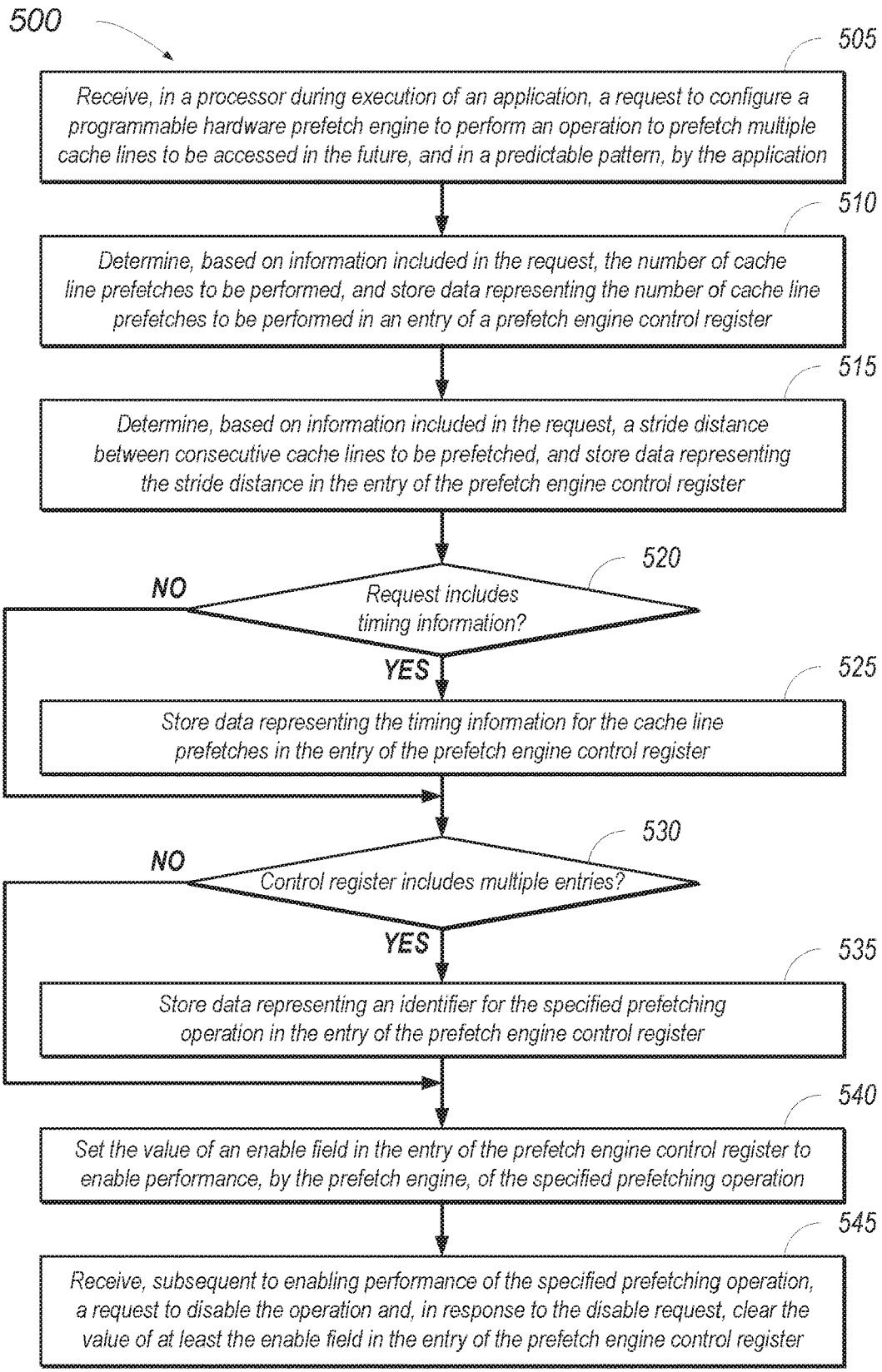
FIG. 5 is a flow diagram illustrating a method for configuring, enabling, and disabling a programmable hardware prefetch engine for performing a multiple cache line prefetching operation, according to some embodiments of the present disclosure.

FIG. 5 is a flow diagram illustrating a method 500 for configuring, enabling, and disabling a programmable hardware prefetch engine for performing a multiple cache line prefetching operation, according to some embodiments of the present disclosure. Method 500 may be implemented by one or more of the elements shown in FIGS. 1A-2, 4, or 7A-14. Method 500 may be initiated by any suitable criteria and may initiate operation at any suitable point. In one embodiment, method 500 may initiate operation at 505. Method 500 may include greater or fewer operations than those illustrated or described below. Moreover, the operations of method 500 may be executed in an order different than those illustrated or described below. Method 500 may terminate at any suitable operation. Moreover, method 500 may repeat operation at any suitable operation. Any operations of method 500 may be performed in parallel with other operations of method 500, or in parallel with operations of other methods. Furthermore, method 500 may be executed multiple times to configure, enable, and disable a programmable hardware prefetch engine for performing different prefetching operations, each of which prefetches multiple cache lines. In some embodiments, method 500 may be invoked during the execution of method 300 to perform some of the operations of method 300.

At 505, in one embodiment, a request to configure a programmable hardware prefetch engine to perform a prefetching operation to prefetch multiple cache lines to be accessed in the future, and in a predictable pattern, by an application, may be received in a processor during execution of the application. For example, a prefetch_engine_enable instruction may be received by the processor in an instruction stream. In various embodiments, the prefetch_engine_enable instruction may have been inserted into the instruction stream by a compiler, a just-in-time interpreter, or another suitable mechanism, or may have been designated by a drafter of the currently executing code (e.g., application code). In at least some embodiments, the programmable hardware prefetch engine may be implemented using hardware circuitry. In one embodiment, the programmable hardware prefetch engine may be a hardware state machine.

At 510, the number of cache line prefetches to be performed by the programmable hardware prefetch engine as part of the requested prefetching operation may be determined based on information included in the request, and data representing the number of cache line prefetches to be performed may be stored in an entry of a prefetch engine control register. For example, data representing the number of cache line prefetches to be performed may be included in the request and this data may be stored in an entry in the control register. In another example, data representing the total size of the prefetched cache lines (e.g., in bytes) may be included in the request, and the number of cache line prefetches corresponding to the total size of the prefetched cache lines may be computed from the size data, after which data representing the number of cache line prefetches to be performed may be stored in an entry in the control register. In other embodiments, data representing the total size of the prefetched cache lines (e.g., in bytes) may be included in the request, and this data, rather than the number of cache line prefetches to be performed, may be stored in an entry in the control register.

At 515, a stride distance between consecutive cache lines to be prefetched may be determined based on information included in the request, and data representing the determined stride distance may be stored in the entry of the prefetch engine control register along with the data representing the number of cache line prefetches to be performed. For example, the request may include data representing the distance (in terms of cache lines) from each prefetched cache line to the next cache line to be prefetched, as described above.

At 520, if the request includes timing information for the cache line prefetches, method 500 may continue at 525. Otherwise, method 500 may proceed directly to 530. At 525, data representing the timing information for the cache line prefetches may be stored in the entry of the prefetch engine control register, along with the data described above in reference to 510 and 515. At 530, if the prefetch engine control register includes multiple entries, each storing parameters to be applied to a different multiple cache line prefetching operation, method 500 may continue at 535. Otherwise, method 500 may proceed directly to 540. For example, in some embodiments, the programmable hardware prefetch engine may support multiple outstanding prefetch streams, each of which is associated with a different multiple cache line prefetching operation. Each of the multiple cache line prefetching operations may, in turn, be controlled by a respective entry in the prefetch engine control register. In such embodiments, each of the multiple cache line prefetching operations may be associated with an operation identifier (ID). At 535, data representing an identifier for the specified prefetching operation may be stored in the entry of the prefetch engine control register, along with the data described above in reference to 510, 515 and, if applicable, 525.

At 540, the value of an enable field in the entry of the prefetch engine control register may be set to enable performance, by the programmable hardware prefetch engine, of the specified prefetching operation. For example, in some embodiments, the enable field may include a single bit and its value may be set to "1". At 545, subsequent to enabling the performance of the specified prefetching operation, a request to disable the specified prefetching operation may be received, and, in response to receiving the disable request, the value of at least the enable field in the entry of the prefetch engine control register may be cleared. For example, a prefetch_engine_disable instruction may be received by the processor in an instruction stream. In various embodiments, the prefetch_engine_disable instruction may have been inserted into the instruction stream by a compiler, a just-in-time interpreter, or another suitable mechanism, or may have been designated by a drafter of the currently executing code (e.g., application code). The prefetch_engine_disable instruction may, when executed, set the value of the enable field to "0". In some embodiments, the prefetch_engine_disable instruction may also clear the values stored in any or all of the fields of the entry by the operations shown as 510, 515, 525, and/or 535. In such embodiments, the entry may subsequently be used to store parameters to be applied to a different multiple cache line prefetching operation. In some embodiments, in response to receiving a request to disable the specified prefetching operation, the operation may be disabled, regardless of whether or not the specified prefetching operation was actually performed. For example, if, subsequent to enabling the performance of the specified prefetching operation, but prior to receiving a software prefetch instruction, a request to disable the specified prefetching operation is received, the specified prefetching operation may be disabled without having been performed.

Figure 6:
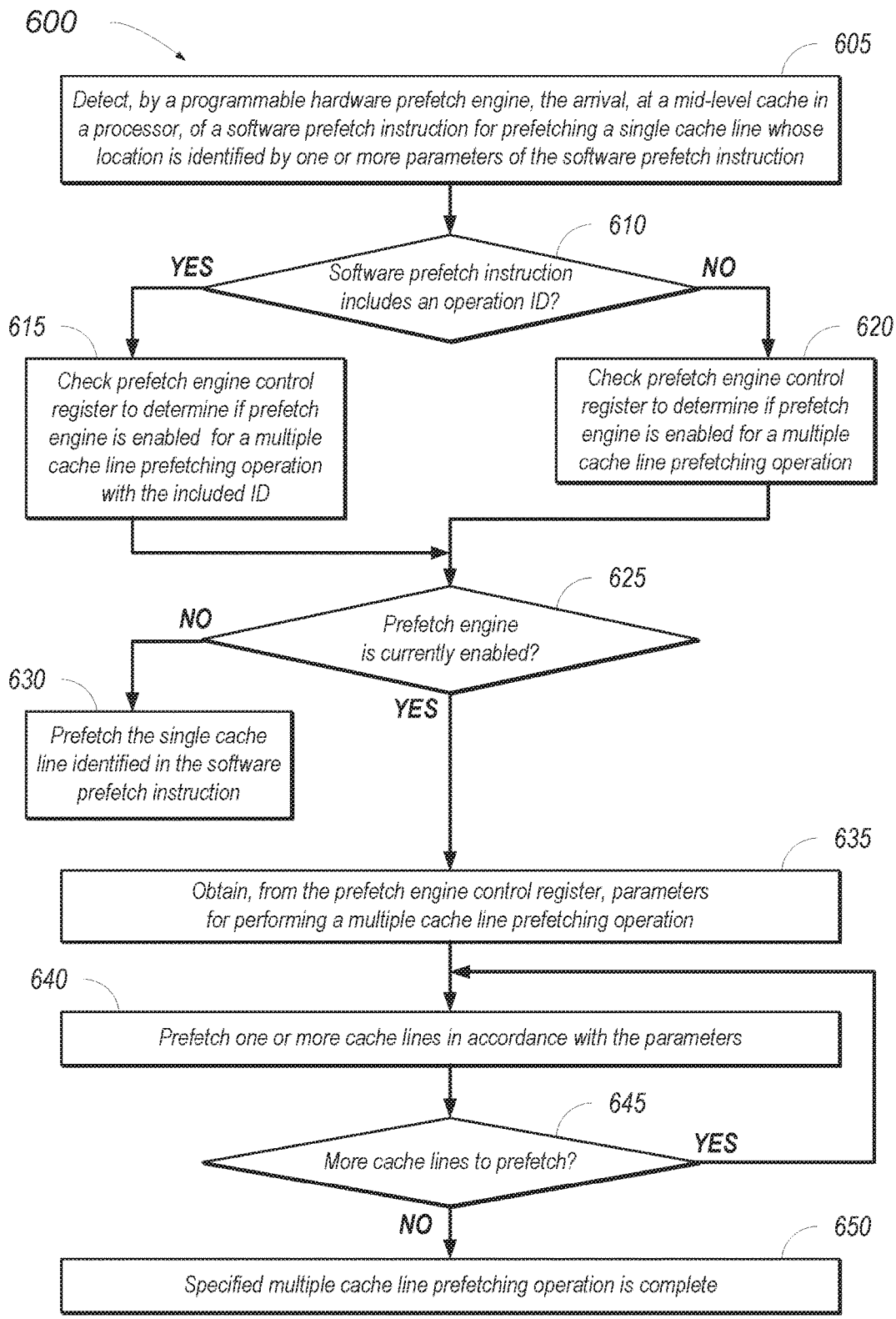
FIG. 6 is flow diagram illustrating a method for performing, by a programmable hardware prefetch engine, multiple cache line prefetching, according to some embodiments of the present disclosure.

FIG. 6 is flow diagram illustrating a method 600 for performing, by a programmable hardware prefetch engine, multiple cache line prefetching, according to some embodiments of the present disclosure. Method 600 may be implemented by one or more of the elements shown in FIGS. 1A-2, 4, or 7A-14. Method 600 may be initiated by any suitable criteria and may initiate operation at any suitable point. In one embodiment, method 600 may initiate operation at 605. Method 600 may include greater or fewer operations than those illustrated or described below. Moreover, the operations of method 600 may be executed in an order different than those illustrated or described below. Method 600 may terminate at any suitable operation. Moreover, method 600 may repeat operation at any suitable operation. Any operations of method 600 may be performed in parallel with other operations of method 600, or in parallel with operations of other methods. Furthermore, method 600 may be executed multiple times to perform different multiple cache line prefetching operations. In some embodiments, method 600 may be invoked during the execution of method 300 to perform some of the operations of method 300.

At 605, in one embodiment, a software prefetch instruction for prefetching a single cache line, whose location is identified by one or more parameters of the software prefetch instruction, may arrive at a mid-level cache in a processor, and may be detected by a programmable hardware prefetch engine associated with the mid-level cache. In some embodiments, the programmable hardware prefetch engine may be an element of a programmable memory prefetcher that also includes a prefetch engine control register. In at least some embodiments, the programmable hardware prefetch engine may be implemented using hardware circuitry. In one embodiment, the programmable hardware prefetch engine may be a hardware state machine.

If, at 610, it is determined that the software prefetch instruction includes (e.g. as an input parameter) an operation identifier, method 600 may proceed to 615. Otherwise, method 600 may proceed to 620. At 615, the prefetch engine control register may be checked to determine whether the programmable hardware prefetch engine is enabled for a multiple cache line prefetching operation having the operation identifier that was included in the software prefetch instruction. In this case, it may be assumed that the programmable hardware prefetch engine supports multiple entries, each of which includes a respective operation identifier. At 620, the prefetch engine control register may be checked to determine whether the programmable hardware prefetch engine is currently enabled for a multiple cache line prefetching operation (e.g., any prefetch operation). In this case, it may be assumed that the programmable hardware prefetch engine does not support multiple entries, each of which includes a respective operation identifier. In either case, if at 625, it is determined that the programmable hardware prefetch engine is currently enabled, whether generally or for an identified multiple cache line prefetching operation, method 600 may continue at 635. Otherwise, method 600 may proceed to 630.

At 630, the single cache line identified in the software prefetch instruction may be prefetched, after which no further action is taken in response to receiving the software prefetch instruction. At 635, parameters for a multiple cache line prefetching operation may be obtained from the prefetch engine control register. At 640, one or more cache lines may be prefetched in accordance with the parameters obtained from the prefetch engine control register. If, at 645, it is determined that there are more cache lines to prefetch as part of the multiple cache line prefetching operation, method 600 may return to 640 one or more times until there are no additional cache lines to prefetch as part of the multiple cache line prefetching operation. If, or once there are no additional cache lines to prefetch as part of the multiple cache line prefetching operation, method 600 may proceed to 650, at which point the specified multiple cache line prefetching operation is complete.

In at least some embodiments, the techniques described herein may be implemented in a processor with relatively low overhead, in terms of the addition of new instructions, since they primarily leverage existing software prefetch instructions, and control register reads and writes, to set up the state machine within the programmable hardware prefetch engine and to trigger its operation. In some embodiments in which the system provides support for more than one thread per processor core, there may be a respective prefetch engine control register for each thread. In some embodiments, there may be a respective programmable hardware prefetch engine per thread. In other embodiments, there may be a respective programmable hardware prefetch engine per processor core.

In some embodiments in which the programmable hardware prefetch engine includes support for multiple outstanding prefetch streams, the programmable hardware prefetch engine may decide whether and how many different prefetch streams it can handle at once, depending on what is going on in the machine at runtime. This is something that is often hard for software to predict when it inserts software prefetch instructions.

In some embodiments, if a prefetch engine control register is associated with a particular thread, it may be considered to be part of the thread state. As such, it may be saved, along with the rest of the thread state, on context switches. In other embodiments, if a prefetch engine control register is not saved along with the thread state on context switches, the contents of the prefetch engine control register may be cleared on context switches. Clearing the prefetch engine control register on context switches may avoid unintended behavior by the thread, or by another thread, following a context switch.

In at least some embodiments, the mechanisms described herein for performing multiple cache line prefetching operations using a programmable hardware prefetch engine have been shown to outperform existing solutions, such as existing stream prefetchers, because they accept software hints regarding what to prefetch and how much to prefetch. For example, for sparse matrix-dense vector multiplication, this approach may potentially increase the per-core performance by up to 2.5×, while reducing the number of wasted memory accesses by up to 50% for real world datasets. This speedup may primarily be attributed to overlapping computation at the processor core with data fetches at the mid-level cache.

The figures described below include detailed examples of architectures and systems to implement embodiments of the hardware components and/or instructions described above. In some embodiments, one or more hardware components and/or instructions described above may be emulated as described in detail below, or may be implemented as software modules.

Example Core Architectures, Processors, and Computer Architectures

Processor cores may be implemented in different ways, for different purposes, and in different processors. For instance, in various embodiments, such cores may include a general purpose in-order core intended for general-purpose computing, a high-performance general purpose out-of-order core intended for general-purpose computing, and/or a special purpose core intended primarily for graphics and/or scientific computing (e.g., high throughput computing). In various embodiments, different processors may include a central processing unit (CPU), including one or more general purpose in-order cores intended for general-purpose computing and/or one or more general purpose out-of-order cores intended for general-purpose computing, and a coprocessor, including one or more special purpose cores intended primarily for graphics and/or scientific computing (e.g., high throughput computing). Such different processors may lead to different computer system architectures, in different embodiments. For example, in some embodiments, a coprocessor may be on a separate chip than a CPU. In other embodiments, a coprocessor may be on a separate die than a CPU, but may be in the same package as the CPU. In some embodiments, a coprocessor may be on the same die as a CPU. In this case, the coprocessor may sometimes be referred to as special purpose logic, which may include integrated graphics and/or scientific logic (e.g., high throughput logic), or as a special purpose core. In some embodiments, a system on a chip may include, on the same die, a CPU as described above (which may be referred to as the application core(s) or application processor(s)), a coprocessor as described above, and additional functionality. Example core architectures, processors, and computer architectures are described below, according to some embodiments.

Example Core Architectures

In-Order and Out-of-Order Core Block Diagram

Figure 7A:
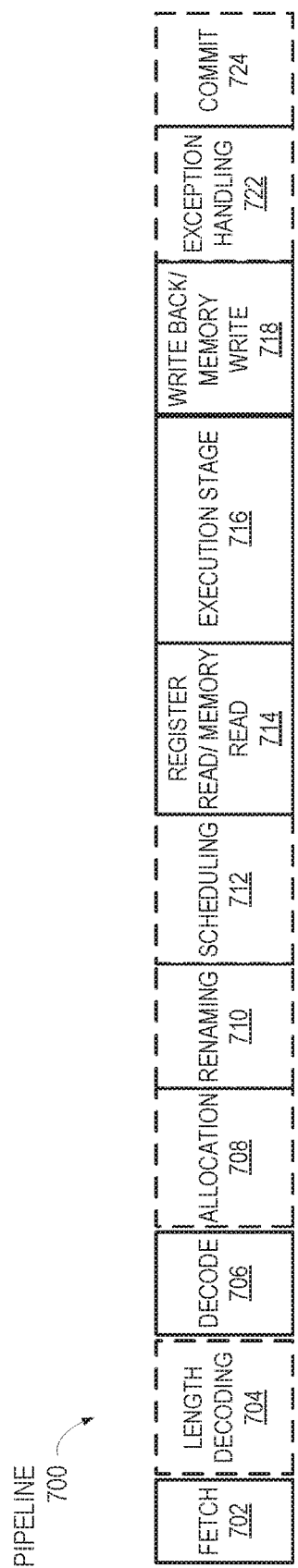
FIG. 7A is a block diagram illustrating an in-order pipeline and a register renaming, out-of-order issue/execution pipeline, according to some embodiments of the present disclosure.
Figure 7B:
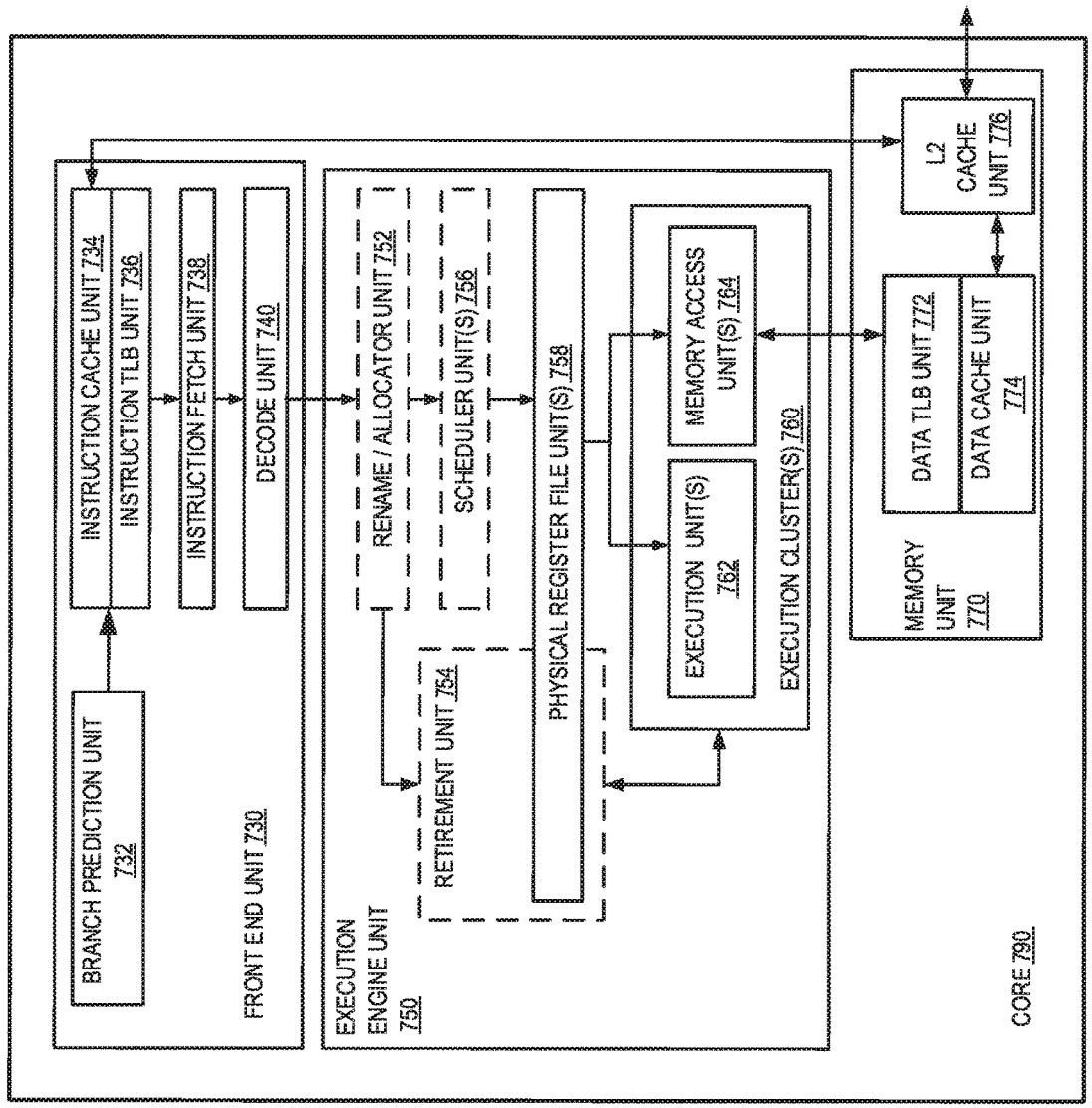
FIG. 7B is a block diagram illustrating an in-order architecture core and register renaming, out-of-order issue/execution logic to be included in a processor, according to some embodiments of the present disclosure.

FIG. 7A is a block diagram illustrating an example in-order pipeline and a register renaming, out-of-order issue/execution pipeline, according to some embodiments. FIG. 7B is a block diagram illustrating an in-order architecture core and register renaming, out-of-order issue/execution logic to be included in a processor, according to some embodiments. The solid lined boxes in FIG. 7A illustrate the in-order pipeline, while the dashed lined boxes illustrate the register renaming, out-of-order issue/execution pipeline. Similarly, the solid lined boxes in FIG. 7B illustrate the in-order architecture logic, while the dashed lined boxes illustrate the register renaming logic and out-of-order issue/execution logic.

In FIG. 7A, a processor pipeline 700 includes a fetch stage 702, a length decoding stage 704, a decode stage 706, an allocation stage 708, a renaming stage 710, a scheduling stage 712 (also known as a dispatch or issue stage), a register read/memory read stage 714, an execution stage 716, a write back/memory write stage 718, an exception handling stage 722, and a commit stage 724.

In FIG. 7B, arrows denote a coupling between two or more units and the direction of the arrow indicates a direction of data flow between those units. In this example, FIG. 7B illustrates a processor core 790 including a front end unit 730 coupled to an execution engine unit 750, both of which may be coupled to a memory unit 770. The core 790 may be a reduced instruction set computing (RISC) core, a complex instruction set computing (CISC) core, a very long instruction word (VLIW) core, or a core of a hybrid or alternative core type, in different embodiments. In various embodiments, core 790 may be a special-purpose core, such as, for example, a network core, a communication core, a compression engine, a coprocessor core, a general-purpose computing graphics processing unit (GPGPU) core, a graphics core, or another type of special-purpose core.

In this example, front end unit 730 includes a branch prediction unit 732 coupled to an instruction cache unit 734. Instruction cache unit 734 may be coupled to an instruction translation lookaside buffer (TLB) unit 736. TLB unit 736 may be coupled to an instruction fetch unit 738, which may be coupled to a decode unit 740. Decode unit 740 may decode instructions, and may generate as an output one or more micro-operations, micro-code entry points, microinstructions, other instructions, or other control signals, which are decoded from, or which otherwise reflect, or are derived from, the original undecoded instructions. Decode unit 740 may be implemented using any of a variety of suitable mechanisms, in different embodiments. Examples of suitable mechanisms may include, but are not limited to, look-up tables, hardware circuitry, programmable logic arrays (PLAs), microcode read only memories (ROMs). In one embodiment, instruction cache unit 734 may be further coupled to a level 2 (L2) cache unit 776 in memory unit 770. In one embodiment, the core 790 may include a microcode ROM or other medium that stores microcode for certain macroinstructions (e.g., within decode unit 740 or elsewhere within the front end unit 730). The decode unit 740 may be coupled to a rename/allocator unit 752 within the execution engine unit 750.

In this example, execution engine unit 750 includes the rename/allocator unit 752, which may be coupled to a retirement unit 754 and a set of one or more scheduler unit(s) 756. Scheduler unit(s) 756 may represent any number of different schedulers of various types, including those that implement reservation stations or those that implement a central instruction window. As illustrated in this example, scheduler unit(s) 756 may be coupled to physical register file unit(s) 758. Each of the physical register file units 758 may represent one or more physical register files, different ones of which store data of one or more different data types including, but not limited to, scalar integer, scalar floating point, packed integer, packed floating point, vector integer, vector floating point, or status data types. One example of the use of a status data type may be an instruction pointer that indicates the address of the next instruction to be executed. In one embodiment, a physical register file unit 758 may include a vector register unit, a write mask register unit, and a scalar register unit (not shown). These register units may provide architectural vector registers, write mask registers (e.g., vector mask registers), and general-purpose registers.

In FIG. 7B, the physical register file unit(s) 758 are shown as being overlapped by the retirement unit 754 to illustrate various ways in which register renaming and out-of-order execution may be implemented. For example, in different embodiments, register renaming and out-of-order execution may be implemented using one or more reorder buffers and one or more retirement register files; using one or more future files, one or more history buffers, and one or more retirement register files; or using register maps and a pool of registers. In general, the architectural registers may be visible from outside of the processor and/or from a programmer's perspective. The registers are not limited to any particular known type of circuit. Rather, any of a variety of different types of registers may be suitable for inclusion in core 790 as long as they store and provide data as described herein. Examples of suitable registers include, but are not limited to, dedicated physical registers, dynamically allocated physical registers using register renaming, and combinations of dedicated and dynamically allocated physical registers. In the example illustrated in FIG. 7B, retirement unit 754 and physical register file unit(s) 758 are coupled to the execution cluster(s) 760. Each of the execution clusters 760 may include a set of one or more execution units 762 and a set of one or more memory access units 764. Execution units 762 may perform various operations (e.g., shifts, addition, subtraction, multiplication) and may operate on various types of data (e.g., scalar floating point, packed integer, packed floating point, vector integer, vector floating point). While some embodiments may include a number of execution units dedicated to specific functions or sets of functions, other embodiments may include only one execution unit, or may include multiple execution units, all of which perform all supported functions or operations. In the example illustrated in FIG. 7B, scheduler unit(s) 756, physical register file unit(s) 758, and execution cluster(s) 760 are shown as potentially including a plurality of such units since some embodiments include separate pipelines for certain types of data/operations. For example, some embodiments may include a scalar integer pipeline, a scalar floating point/packed integer/packed floating point/vector integer/vector floating point pipeline, and/or a memory access pipeline, each of which includes its own scheduler unit, physical register file unit, and/or execution cluster. In some embodiments that include a separate memory access pipeline, only the execution cluster of this pipeline includes a memory access unit 764. It should also be understood that where separate pipelines are used, one or more of these pipelines may be out-of-order issue/execution pipelines and the rest may be in-order execution pipelines.

In the example illustrated in FIG. 7B, the set of memory access units 764 may be coupled to the memory unit 770, which includes a data TLB unit 772. Data TLB unit 772 may be coupled to a data cache unit 774, which in turn may be coupled to a level 2 (L2) cache unit 776. In one example embodiment, the memory access units 764 may include a load unit, a store address unit, and a store data unit, each of which may be coupled to the data TLB unit 772 in the memory unit 770. The L2 cache unit 776 may be coupled to one or more other levels of cache and, eventually, to a main memory. While FIG. 7B illustrates an embodiment in which instruction cache unit 734, data cache unit 774, and level 2 (L2) cache unit 776 reside within core 790, in other embodiments one or more caches or cache units may be internal to a core, external to a core, or apportioned internal to and external to a core in different combinations.

In one example embodiment, the register renaming, out-of-order issue/execution core architecture illustrated in FIG. 7B may implement pipeline 700 illustrated in FIG. 7B as follows. The instruction fetch unit 738 may perform the functions of the fetch and length decoding stages 702 and 704. The decode unit 740 may perform the functions of decode stage 706. The rename/allocator unit 752 may perform the functions of the allocation stage 708 and the renaming stage 710. The scheduler unit(s) 756 may perform the functions of the scheduling stage 712. The physical register file unit(s) 758 and the memory unit 770 may, collectively, perform the functions of the register read/memory read stage 714. The execution cluster(s) 760 may perform the functions of the execution stage 716. The memory unit 770 and the physical register file unit(s) 758 may, collectively, perform the functions of the write back/memory write stage 718. In different embodiments, various units (some of which may not be shown) may be involved in performing the functions of the exception handling stage 722. The retirement unit 754 and the physical register file unit(s) 758 may, collectively, perform the functions of the commit stage 724. In different embodiments, core 790 may support one or more instruction sets, including the instruction(s) described herein. For example, in various embodiments, core 790 may support the x86 instruction set (with or without extensions that have been included in recent versions); the MIPS instruction set of MIPS Technologies of Sunnyvale, Calif.; and/or the ARM instruction set of ARM Holdings of Sunnyvale, Calif. (with or without optional additional extensions such as NEON. In one embodiment, core 790 may include logic to support a packed data instruction set extension (e.g., AVX1 or AVX2), thereby allowing the operations used by many multimedia applications to be performed using packed data.

In some embodiments, core 790 may support multithreading (e.g., executing two or more parallel sets of operations or threads), and may do so in a variety of ways. Core 790 may, for example, include support for time sliced multithreading, simultaneous multithreading (in which a single physical core provides a logical core for each of the threads that the physical core is simultaneously executing), or a combination of time sliced and simultaneous multithreading. In one embodiment, for example, core 790 may include support for time sliced fetching and decoding, and for simultaneous multithreading in subsequent pipeline stages, such as in the Intel® Hyperthreading technology.

While register renaming is described herein in the context of out-of-order execution, it should be understood that register renaming may be used in an in-order architecture, in some embodiments. While in the example embodiment illustrated in FIG. 7B, core 790 includes separate instruction and data cache units 734 and 774, respectively, and a shared L2 cache unit 776, in other embodiments core 790 may include a single internal cache for both instructions and data, such as, for example, a Level 1 (L1) internal cache, or multiple levels of internal cache. In some embodiments, the system may include a combination of an internal cache and an external cache (e.g., a cache that is external to the core and/or the processor). In other embodiments, all of the caches may be external to the core and/or the processor.

Specific Example In-Order Core Architecture

Figure 8B:
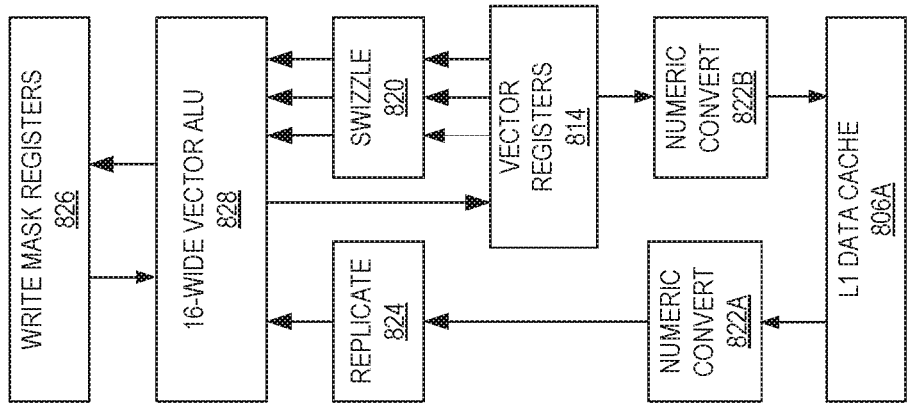
FIGS. 8A and 8B are block diagrams illustrating an example in-order core architecture, according to some embodiments of the present disclosure.
Figure 8A:
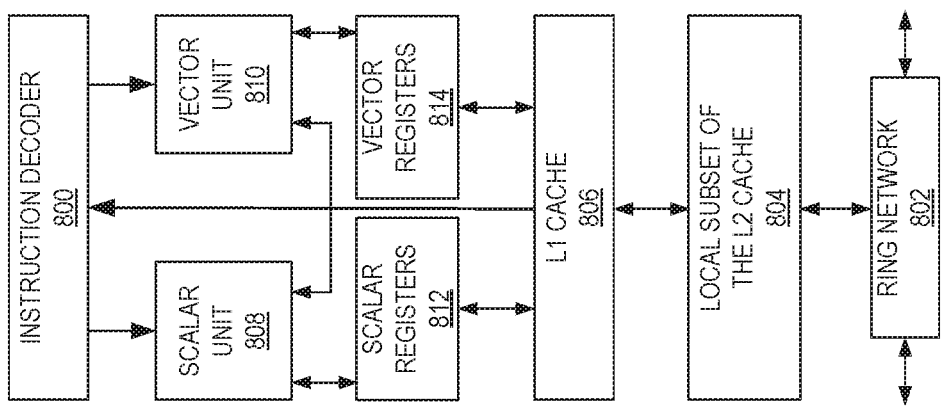

FIGS. 8A and 8B are block diagrams illustrating a more specific example of an in-order core architecture in which a core may be one of several logic blocks (including, for example, other cores of the same type and/or of different types) in a chip. As illustrated in this example, the logic blocks may communicate through a high-bandwidth, on-die interconnect network (e.g., a ring network) with some fixed function logic, memory I/O interfaces, and other necessary I/O logic, depending on the application.

FIG. 8A is a block diagram illustrating a single processor core, along with its connections to an on-die interconnect network (shown as ring network 802) and to its local subset of a Level 2 (L2) cache 804, according to some embodiments. In one embodiment, an instruction decoder 800 may support the x86 instruction set with a packed data instruction set extension. An L1 cache 806 may allow low-latency accesses to cache memory by the scalar and vector units. In one embodiment (e.g., to simplify the design), a scalar unit 808 and a vector unit 810 may use separate register sets (e.g., scalar registers 812 and vector registers 814, respectively) and data that is transferred between them may be written to memory and then read back in from level 1 (L1) cache 806. However, other embodiments may use a different approach. For example, they may include a single register set or may include a communication path that allows data to be transferred between the two register files without being written to memory and read back.

In this example, the local subset of the L2 cache 804 may be part of a global L2 cache that is divided into separate local subsets, e.g., with one subset per processor core. Each processor core may have a direct access path to its own local subset of the L2 cache 804. Data read by a processor core may be stored in its L2 cache subset 804 from which it can be accessed quickly and in parallel with accesses by other processor cores to their own local L2 cache subsets. Data written by a processor core and stored in its own L2 cache subset 804 may be flushed from other L2 cache subsets, if necessary. In some embodiments, the ring network 802 may ensure coherency for shared data. The ring network may be bi-directional to allow agents such as processor cores, L2 caches and other logic blocks to communicate with each other within the chip. In one embodiment, each ring datapath may be 1012 bits wide per direction.

FIG. 8B illustrates an expanded view of part of the processor core illustrated in FIG. 8A, according to some embodiments. In this example, FIG. 8B includes an L1 data cache 806A, which may be part of the L1 cache 806, as well as more detail regarding the vector unit 810 and the vector registers 814. Specifically, the vector unit 810 may be a 16-wide vector processing unit (VPU) that includes a 16-wide vector ALU 828. ALU 828 may be configured to execute one or more of integer, single-precision float, and double-precision float instructions. The VPU may also support swizzling the register inputs (using swizzle unit 820), numeric conversion (using numeric convert units 822A and 822B), and replication (using replicate unit 824) on the memory input. The inclusion of write mask registers 826 may allow for predicating resulting vector writes.

Figure 9:
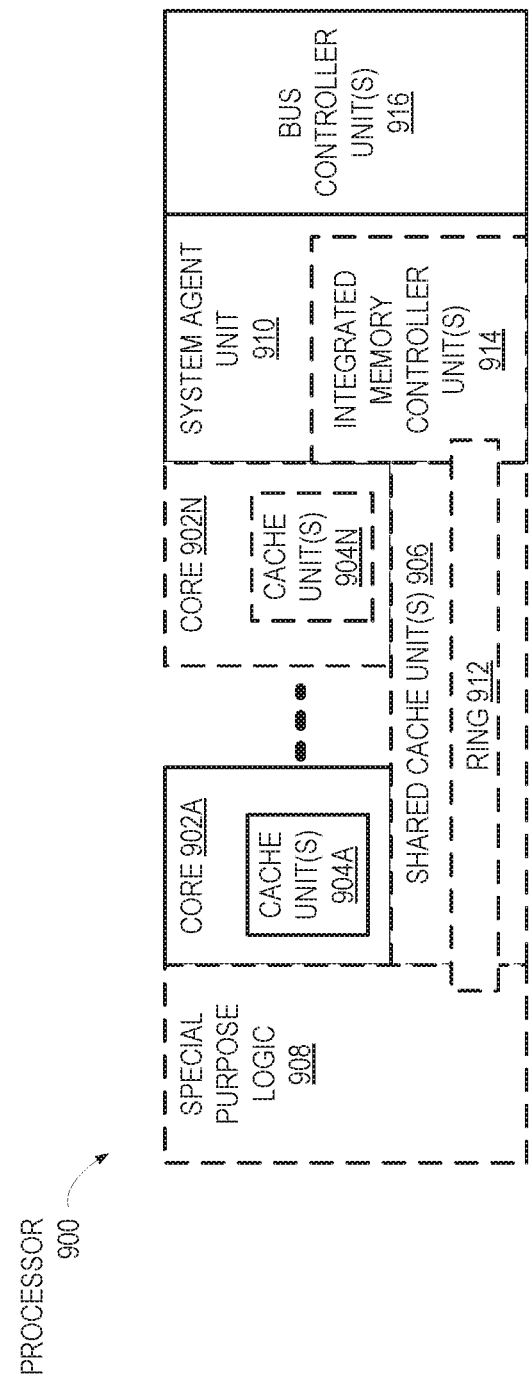
FIG. 9 is a block diagram illustrating a processor, according to some embodiments of the present disclosure.

FIG. 9 is a block diagram illustrating a processor 900 that, in some embodiments, may include more than one core, an integrated memory controller, and/or may special purpose logic (such as for integrated graphics computing). The solid lined boxes in FIG. 9 illustrate a processor 900 that includes a single core 902A, a system agent 910, and a set of one or more bus controller units 916. With the optional addition of the dashed lined boxes, an alternative embodiment of processor 900 includes multiple cores 902A-902N, and also includes a set of one or more integrated memory controller unit(s) 914 within the system agent unit 910, and special purpose logic 908. In some embodiments, one or more of cores 902A-902N may be similar to processor core 790 illustrated in FIG. 7B or the processor core illustrated in FIGS. 8A and 8B.

In some embodiments, processor 900 may represent a CPU in which the special purpose logic 908 includes integrated graphics and/or scientific logic (which may include one or more cores), and in which the cores 902A-902N include one or more general purpose cores (e.g., general purpose in-order cores, general purpose out-of-order cores, or a combination of the two). In other embodiments, processor 900 may represent a coprocessor in which the cores 902A-902N include a large number of special purpose cores intended primarily for graphics and/or scientific computing (e.g., high throughput computing). In still other embodiments, processor 900 may represent a coprocessor in which the cores 902A-902N include a large number of general purpose in-order cores. Thus, in different embodiments, the processor 900 may be a general purpose processor, a coprocessor, or a special purpose processor, such as, for example, a network or communication processor, compression engine, graphics processor, GP GPU (general purpose graphics processing unit), a high-throughput "many integrated core" (MIC) coprocessor (including, for example, 30 or more cores), an embedded processor, or another type of processor. The processor 900 may be implemented on one chip or on more than one chip, in different embodiments. The processor 900 may be a part of and/or may be implemented on one or more substrates using any of a number of process technologies, such as, for example, bipolar complementary metal oxide semiconductor (BiCMOS), complementary metal oxide semiconductor (CMOS), or n-channel metal oxide semiconductor (NMOS).

In the example illustrated in FIG. 9, the memory hierarchy includes one or more levels of cache within each of the cores 902A-902N, shown as cache units 904A-904N, a set of one or more shared cache units 906, and external memory (not shown), some or all of which are coupled to the set of integrated memory controller units 914. The set of shared cache units 906 may include one or more mid-level caches, such as level 2 (L2) cache, a level 3 (L3) cache, a level 4 (L4) cache, other levels of cache, a last-level cache (LLC), and/or combinations thereof. In one embodiment, a ring based interconnect unit 912 may be used to interconnect the special purpose logic 908 (which may include integrated graphics logic), the set of shared cache units 906, and the system agent unit 910/integrated memory controller unit(s) 914. In other embodiments, any number of other suitable techniques may be used for interconnecting such units. In one embodiment, coherency may be maintained between one or more shared cache units 906 and cores 902A-902N.

In some embodiments, one or more of the cores 902A-902N may be capable of multithreading. In some embodiments, the system agent 910 may include circuitry or logic for coordinating and operating cores 902A-902N. For example, the system agent unit 910 may include a power control unit (PCU) and a display unit. The PCU may be or include logic and circuitry for regulating the power state of the cores 902A-902N and the special purpose logic 908 (which may include integrated graphics logic). The display unit may include circuitry or logic for driving one or more externally connected displays.

In various embodiments, the cores 902A-902N may be homogenous or heterogeneous in terms of architecture instruction set. That is, two or more of the cores 902A-902N may be capable of executing the same instruction set, while others may be capable of executing only a subset of that instruction set or may execute a different instruction set.

Example Computer Architectures

Figure 10:
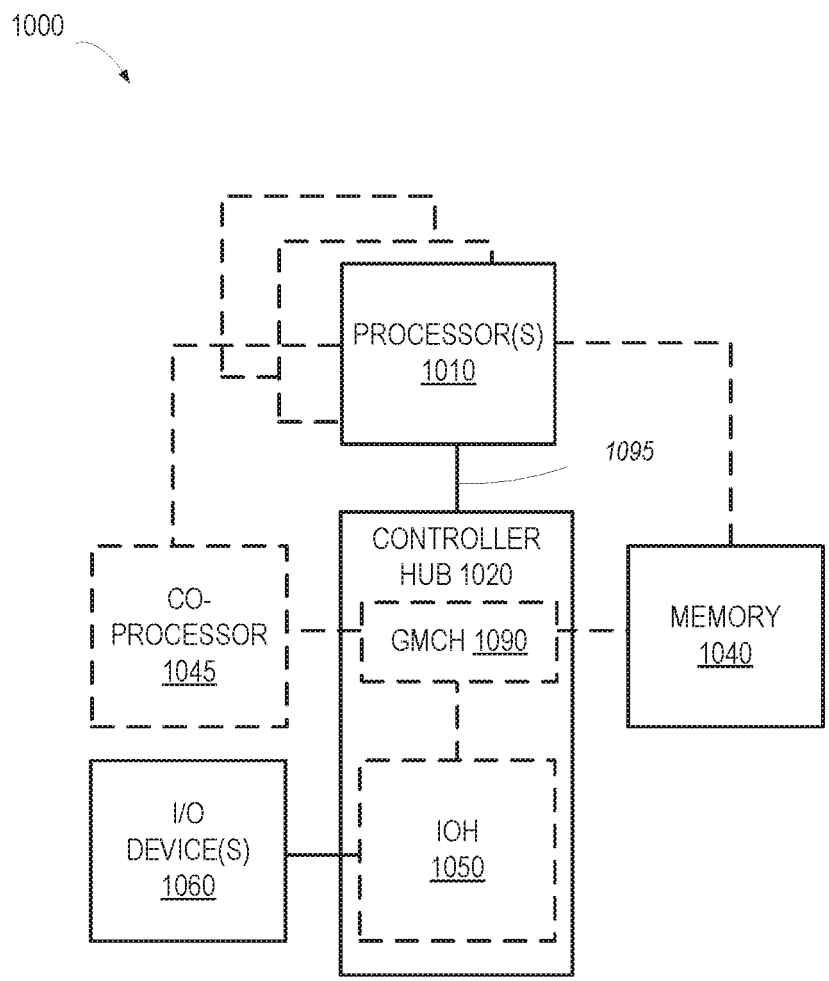
FIGS. 10 through 13 are block diagrams illustrating example computer architectures, according to some embodiments of the present disclosure.
Figure 11:
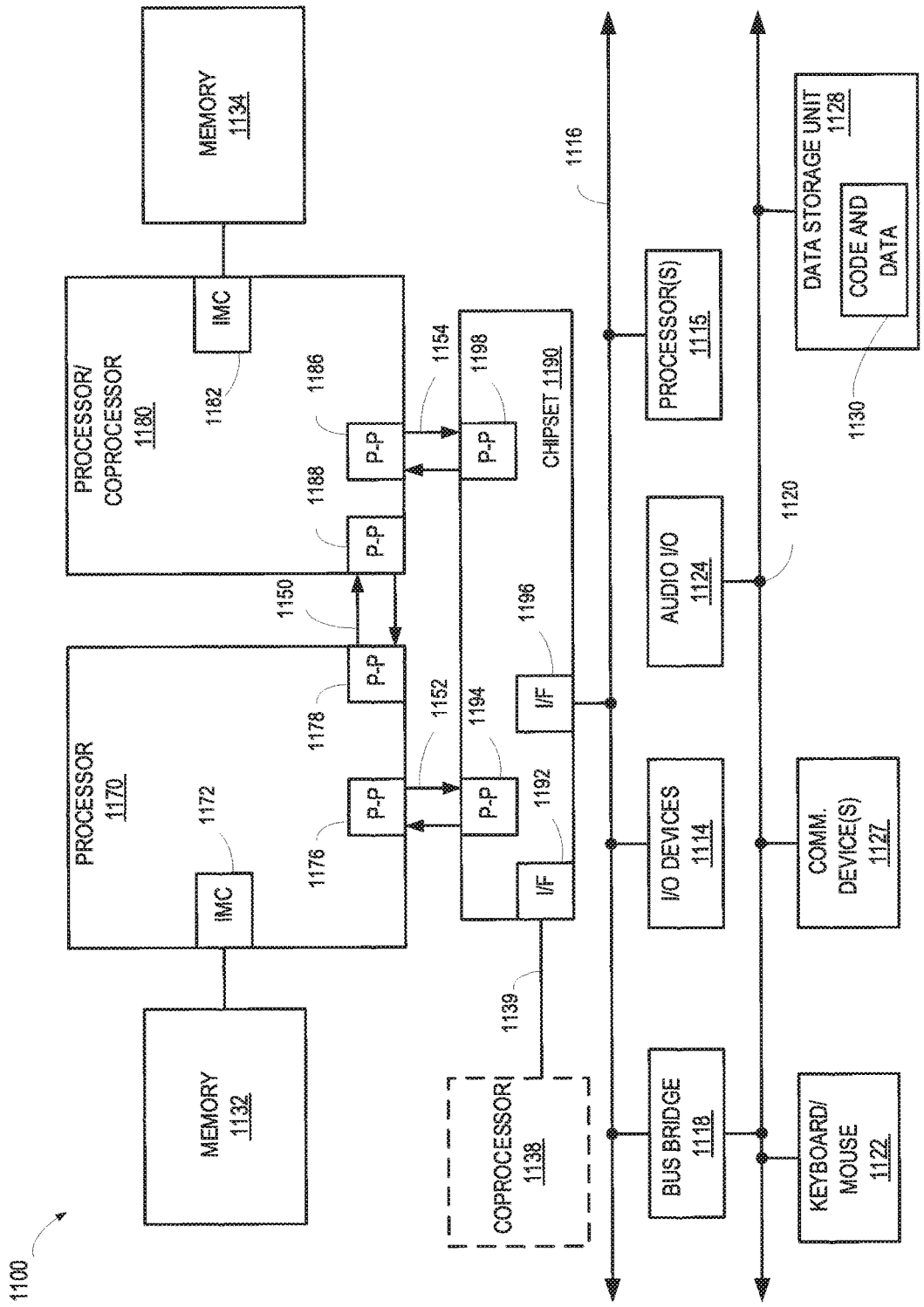
Figure 12:
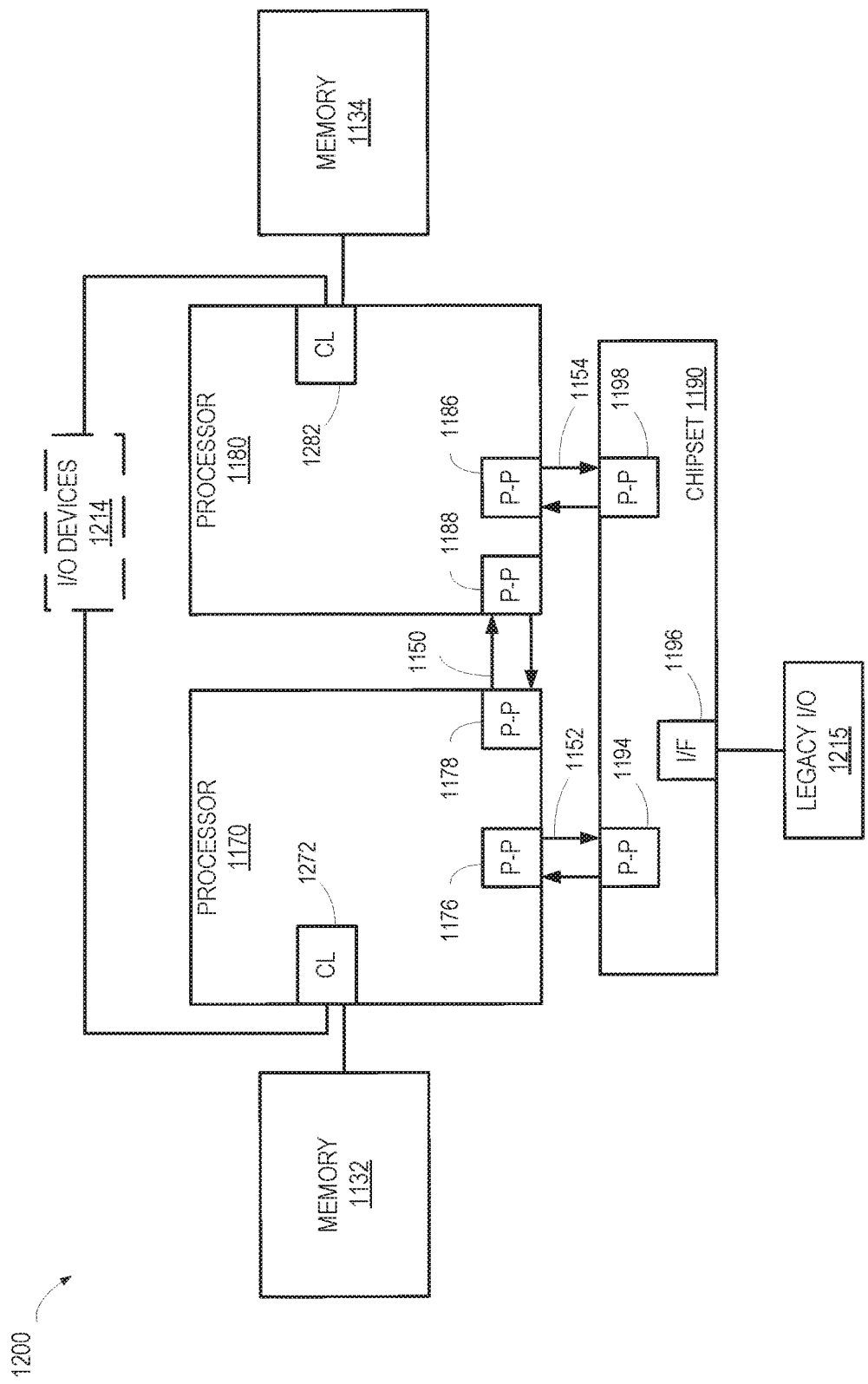
Figure 13:
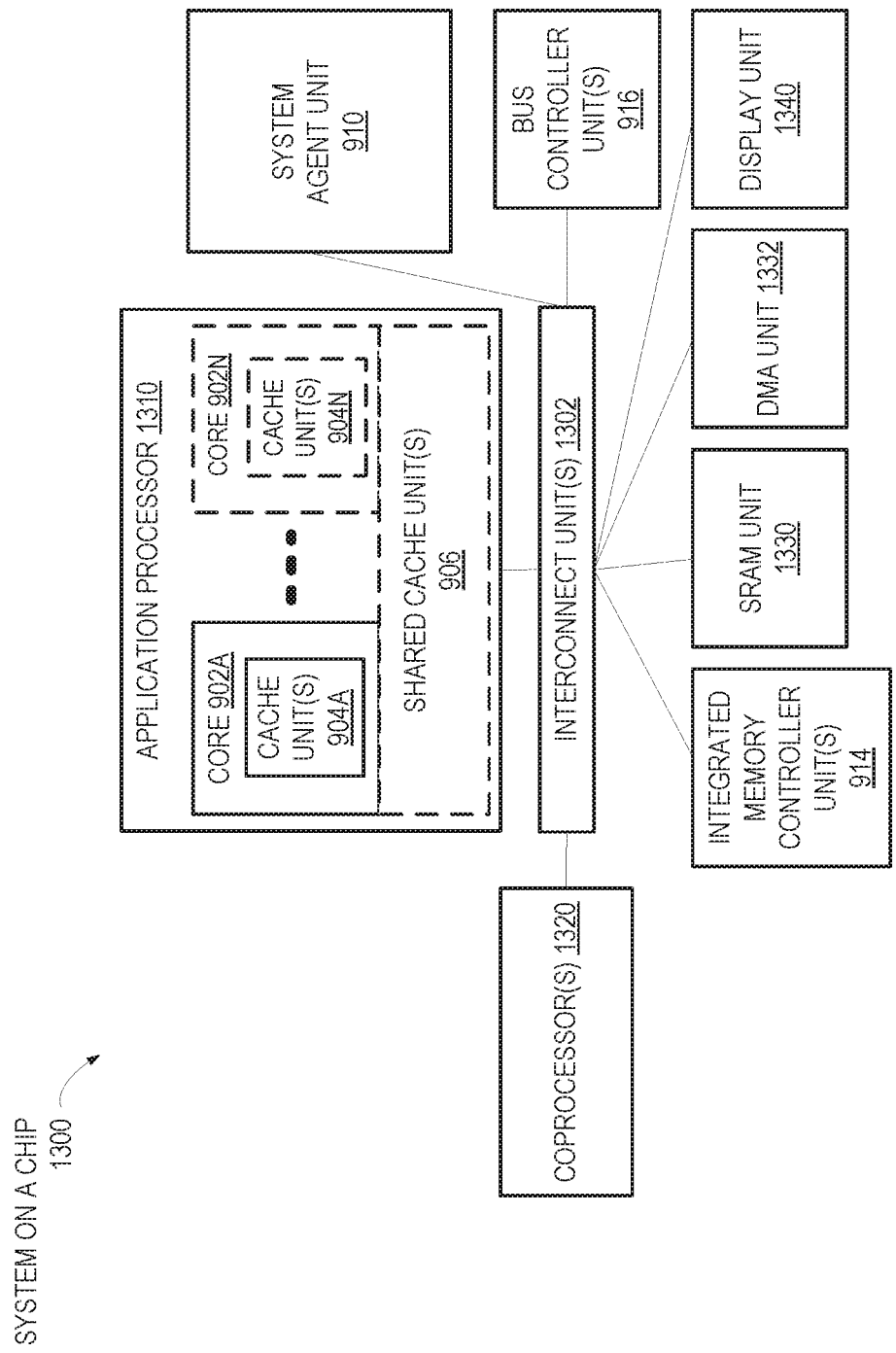

FIGS. 10 through 12 are block diagrams illustrating example systems suitable for the inclusion of one or more processors including, but not limited to, the processors described herein. FIG. 13 illustrates an example system on a chip (SoC) that may include one or more processor cores including, but not limited to, the processor cores described herein. Other system designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable for inclusion of the processors and/or processor cores described herein. In general, a huge variety of systems or electronic devices capable of incorporating a processor and/or other execution logic as disclosed herein are generally suitable for inclusion of the processors and/or processor cores described herein.

FIG. 10 is a block diagram illustrating a system 1000, in accordance with one embodiment of the present disclosure. As illustrated in this example, system 1000 may include one or more processors 1010, which are coupled to a controller hub 1020. In some embodiments, controller hub 1020 may include a graphics memory controller hub (GMCH) 1090 and an Input/Output Hub (IOH) 1050. In some embodiments, GMCH 1090 and IOH 1050 may be on separate chips. In this example, GMCH 1090 may include memory and graphics controllers (not shown) to which are coupled memory 1040 and a coprocessor 1045, respectively. In this example, IOH 1050 couples one or more input/output (I/O) devices 1060 to GMCH 1090. In various embodiments, one or both of the memory and graphics controllers may be integrated within the processor (as described herein), the memory 1040 and/or the coprocessor 1045 may be coupled directly to the processor(s) 1010, or the controller hub 1020 may be implemented in a single chip that includes the IOH 1050. The optional nature of additional processors 1010 is denoted in FIG. 10 with broken lines. Each processor 1010 may include one or more of the processing cores described herein and may be implemented by a version of the processor 900 illustrated in FIG. 9 and described herein.

In various embodiments, the memory 1040 may, for example, be dynamic random access memory (DRAM), phase change memory (PCM), or a combination of the two. In at least some embodiments, the controller hub 1020 may communicate with the processor(s) 1010 via a multi-drop bus such as a frontside bus (FSB), a point-to-point interface such as QuickPath Interconnect (QPI), or a similar connection, any one of which may be represented in FIG. 10 as interface 1095.

In one embodiment, the coprocessor 1045 may be a special purpose processor, such as, for example, a high-throughput MIC processor, a network or communication processor, a compression engine, a graphics processor, a GPGPU, an embedded processor, or another type of coprocessor. In one embodiment, controller hub 1020 may include an integrated graphics accelerator (not shown).

In some embodiments, there may be a variety of differences between the physical resources of different ones of the processors 1010. For example, there may be differences between the physical resources of the processors in terms of a spectrum of metrics of merit including architectural characteristics, micro-architectural characteristics, thermal characteristics, power consumption characteristics, and/or other performance-related characteristics.

In one embodiment, a processor 1010 may execute instructions that control data processing operations of a general type. Embedded within the instructions may be coprocessor instructions. The processor 1010 may recognize these coprocessor instructions as being of a type that should be executed by the attached coprocessor 1045. Accordingly, the processor 1010 may issue these coprocessor instructions (or control signals representing coprocessor instructions), on a coprocessor bus or other interconnect, to coprocessor 1045. Coprocessor 1045 may accept and execute the received coprocessor instructions.

FIG. 11 is a block diagram illustrating a first example system 1100, in accordance with one embodiment of the present disclosure. As shown in FIG. 11, multiprocessor system 1100 implements a point-to-point interconnect system. For example, system 1100 includes a first processor 1170 and a second processor 1180 coupled to each other via a point-to-point interconnect 1150. In some embodiments, each of processors 1170 and 1180 may be a version of the processor 900 illustrated in FIG. 9. In one embodiment, processors 1170 and 1180 may be implemented by respective processors 1010, while coprocessor 1138 may be implemented by a coprocessor 1045. In another embodiment, processors 1170 and 1180 may be implemented by a processor 1010 and a coprocessor 1045, respectively.

Processors 1170 and 1180 are shown including integrated memory controller (IMC) units 1172 and 1182, respectively. Processor 1170 also includes, as part of its bus controller units, point-to-point (P-P) interfaces 1176 and 1178. Similarly, processor 1180 includes P-P interfaces 1186 and 1188. Processors 1170 and 1180 may exchange information via a point-to-point (P-P) interface 1150 using P-P interface circuits 1178 and 1188. As shown in FIG. 11, IMCs 1172 and 1182 couple the processors to respective memories, shown as memory 1132 and memory 1134, which may be portions of a main memory that are locally attached to the respective processors.

Processors 1170 and 1180 may each exchange information with a chipset 1190 via individual P-P interfaces 1152 and 1154 respectively, using point to point interface circuits 1176, 1194, 1186, and 1198. Chipset 1190 may optionally exchange information with the coprocessor 1138 via interface 1192 over a high-performance interface 1139. In one embodiment, the coprocessor 1138 may be a special purpose processor, such as, for example, a high-throughput MIC processor, a network or communication processor, a compression engine, a graphics processor, a GPGPU, an embedded processor, or another type of special purpose processor. In one embodiment, coprocessor 1138 may include a high-performance graphics circuit and interface 1139 may be a high-performance graphics bus.

A shared cache (not shown) may be included in either processor or outside of both processors, yet may be connected with the processors via a P-P interconnect, such that either or both processors' local cache information may be stored in the shared cache if a processor is placed into a low power mode.

Chipset 1190 may be coupled to a first bus 1116 via an interface 1196. In various embodiments, first bus 1116 may be a Peripheral Component Interconnect (PCI) bus, a PCI Express bus, or another third generation I/O interconnect bus, although the scope of the present disclosure is not limited to these specific bus types.

As shown in FIG. 11, various I/O devices 1114 may be coupled to first bus 1116, along with a bus bridge 1118. Bus bridge 1118 may couple first bus 1116 to a second bus 1120. In one embodiment, one or more additional processor(s) 1115, such as one or more coprocessors, high-throughput MIC processors, GPGPU's, accelerators (e.g., graphics accelerators or digital signal processing (DSP) units), field programmable gate arrays, and/or any other processors, may be coupled to first bus 1116. In one embodiment, second bus 1120 may be a low pin count (LPC) bus. Various devices may be coupled to second bus 1120 including, for example, a keyboard and/or mouse 1122, one or more communication devices 1127 and a data storage unit 1128. Data storage unit 1128 may be a disk drive or another mass storage device, which may include instructions/code and data 1130, in one embodiment. In some embodiments, an audio I/O device 1124 may be coupled to the second bus 1120. Note that other architectures are possible. For example, instead of the point-to-point architecture illustrated in FIG. 11, a system may implement a multi-drop bus or another type of interconnect architecture.

FIG. 12 is a block diagram illustrating a second example system 1200, in accordance with one embodiment of the present disclosure. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170 and 1180 may include integrated memory and I/O control logic ("CL") units 1272 and 1282, respectively. Thus, CL 1272 and CL 1282 may include integrated memory controller units and may also include I/O control logic. FIG. 12 illustrates that not only are the memories 1132 and 1134 coupled to CL 1272 and CL 1282, respectively, but I/O devices 1214 are also coupled to CL 1272 and CL 1282. In this example system, legacy I/O devices 1215 may also be coupled to the chipset 1190 via an interface 1196.

FIG. 13 is a block diagram illustrating a system on a chip (SoC) 1300, in accordance with one embodiment of the present disclosure. Similar elements in FIGS. 13 and 9 bear like reference numerals. Also, dashed lined boxes represent optional features on more advanced SoCs. In FIG. 13, one or more interconnect unit(s) 1302 are coupled to an application processor 1310, which includes a set of one or more cores 902A-902N, including respective local cache units 904A-904N, and shared cache unit(s) 906. The interconnect unit(s) 1302 are also coupled to a system agent unit 910, one or more bus controller unit(s) 916, one or more integrated memory controller unit(s) 914, a set of one or more coprocessors 1320, a static random access memory (SRAM) unit 1330, a direct memory access (DMA) unit 1332, and a display unit 1340 for coupling to one or more external displays. In one embodiment, the coprocessor(s) 1320 may include a special purpose processor, such as, for example, a network or communication processor, a compression engine, a GPGPU, a high-throughput MIC processor, an embedded processor, or another type of coprocessor. In another embodiment, the coprocessor(s) 1320 may be a media processor that includes integrated graphics logic, an image processor, an audio processor, and/or a video processor.

In various embodiments, the mechanisms disclosed herein may be implemented in hardware, software, firmware, or a combination of such implementation approaches. Some embodiments of the disclosure may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may execute input instructions to perform the functions described herein and to generate output information. The output information may be supplied to one or more output devices, in known fashion. For purposes of this disclosure, a processing system may include any system that includes a processor, such as, for example, a digital signal processor (DSP), a microcontroller, an application specific integrated circuit (ASIC), or a microprocessor.

In some embodiments, the program code may be implemented in a high level procedural or object oriented programming language to communicate with a processing system. The program code may also be implemented in assembly or machine language, in other embodiments. In fact, the mechanisms described herein are not limited in scope to any particular programming language. In general, the programming language may be a compiled language or an interpreted language.

One or more aspects of at least one embodiment may be implemented by representative instructions stored on a non-transitory, machine-readable medium which represents various logic within the processor. The representative instructions, when read by a machine, may cause the machine to fabricate logic to perform the techniques described herein. Such representative instructions, sometimes referred to as "IP cores", may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable memories (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off the processor.

Figure 14:
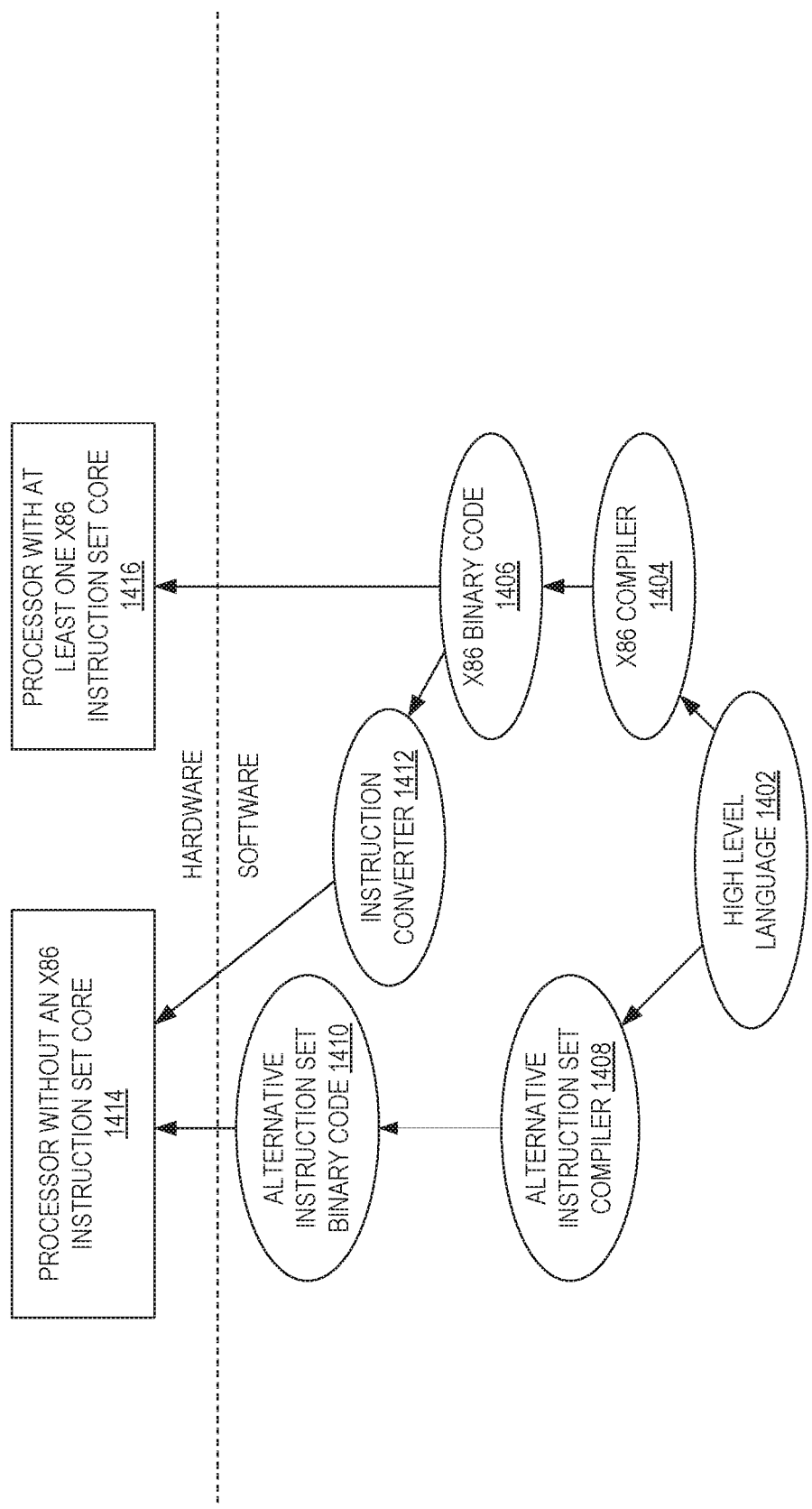
FIG. 14 is a block diagram illustrating the use of a compiler and a software instruction converter to convert binary instructions in a source instruction set to binary instructions in a target instruction set, according to some embodiments of the present disclosure.

FIG. 14 is a block diagram illustrating the use of a compiler and a software instruction converter to convert binary instructions in a source instruction set to binary instructions in a target instruction set, according to some embodiments. In the illustrated embodiment, the instruction converter may be a software instruction converter, although in other embodiments the instruction converter may be implemented in software, firmware, hardware, or various combinations thereof. FIG. 14 illustrates that a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that may perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1404 represents a compiler that may be operable to generate x86 binary code 1406 (e.g., object code) that may, with or without additional linkage processing, be executed on the processor with at least one x86 instruction set core 1416. Similarly, FIG. 14 illustrates that the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS™ instruction set of MIPS Technologies of Sunnyvale, Calif. and/or that execute the ARM™ instruction set of ARM Holdings of Sunnyvale, Calif.). Instruction converter 1412 may be used to convert x86 binary code 1406 into code that may be natively executed by the processor without an x86 instruction set core 1414. This converted code might not be the same as the alternative instruction set binary code 1410; however, the converted code will accomplish the general operation and be made up of instructions from the alternative instruction set. Thus, instruction converter 1412 represents software, firmware, hardware, or a combination thereof that, through emulation, simulation or any other process, allows a processor or other electronic device that does not have an x86 instruction set processor or core to execute x86 binary code 1406.

Thus, techniques for performing one or more instructions according to at least one embodiment are disclosed. While certain example embodiments have been described and shown in the accompanying drawings, it is to be understood that such embodiments are merely illustrative of and not restrictive on other embodiments, and that such embodiments are not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Some embodiments of the present disclosure include a processor. In at least some of these embodiments, the processor may include a programmable hardware prefetch engine, a prefetch engine control register, and circuitry to receive, during execution of an application on the processor, a first instruction executable to configure the programmable hardware prefetch engine for prefetching multiple cache lines to be accessed in the future, at locations addressable in a predictable pattern, by the application, to store, in the prefetch engine control register, dependent on information included in the first instruction, data representing an amount of prefetching to be performed and data representing a stride distance between consecutive cache lines to be prefetched, to receive a second instruction executable to prefetch a single cache line whose location is identified by a parameter of the second instruction, and to initiate, in response to receiving the second instruction, prefetching of multiple cache lines by the programmable hardware prefetch engine, the prefetching to be performed in parallel with execution of the application and in accordance with the data stored in the prefetch engine control register. In combination with any of the above embodiments, the first instruction may include a write request that targets the prefetch engine control register. In combination with any of the above embodiments, the prefetch engine control register may include multiple entries, each of which may include an identifier of a respective operation to prefetch, by the programmable hardware prefetch engine, multiple cache lines, the first instruction may specify an identifier of a given operation to prefetch, by the programmable hardware prefetch engine, multiple cache lines, and the processor may further include circuitry to store the data representing an amount of prefetching to be performed, the data representing a stride distance between consecutive ones of the multiple cache lines to be prefetched, and the identifier of the given operation in one of the entries in the prefetch engine control register. In combination with any of the above embodiments, the processor may further include circuitry to store, in the prefetch engine control register, dependent on information included in the first instruction, data representing a number of execution cycles for which to wait between prefetching consecutives ones of the multiple cache lines. In combination with any of the above embodiments, the programmable hardware prefetch engine may include circuitry to prefetch the multiple cache lines from a last-level cache to a mid-level cache in the processor. In combination with any of the above embodiments, the programmable hardware prefetch engine may include a hardware state machine to prefetch the multiple cache lines asynchronously and in parallel with the execution of the application. In combination with any of the above embodiments, the programmable hardware prefetch engine may include a hardware state machine to prefetch the multiple cache lines asynchronously and in parallel with the execution of the application, and the states through which the hardware state machine moves include a disabled state, an enabled state, and a prefetching state. In combination with any of the above embodiments, the processor may further include circuitry to receive a third instruction executable to disable the prefetching of the multiple cache lines by the programmable hardware prefetch engine, and to store, in the prefetch engine control register in response to receiving the third instruction, data indicating that the programmable hardware prefetch engine is no longer enabled to perform the prefetching of the multiple cache lines. In combination with any of the above embodiments, the data representing an amount of prefetching to be performed may include a value representing the number of prefetches to be performed. In combination with any of the above embodiments, the data representing an amount of prefetching to be performed may include a value representing a maximum total size of the prefetching results. In combination with any of the above embodiments, the processor may further include circuitry to save, in response to a context switch, the contents of the prefetch engine control register. In combination with any of the above embodiments, the processor may further include circuitry to clear, in response to a context switch, the contents of the prefetch engine control register. In combination with any of the above embodiments, the information included in the first instruction may include data representing an address at which to begin the prefetching of the multiple cache lines by the programmable hardware prefetch engine. In combination with any of the above embodiments, the processor may further include circuitry to cause the prefetching of the multiple cache lines by the programmable hardware prefetch engine to begin on a page boundary. In combination with any of the above embodiments, the processor may further include circuitry to prevent the prefetching of the multiple cache lines by the programmable hardware prefetch engine from crossing a page boundary.

Some embodiments of the present disclosure include a method performed in a processor. In at least some of these embodiments, the method may include receiving, during execution of an application on the processor, a first instruction for configuring a programmable hardware prefetch engine for prefetching multiple cache lines to be accessed in the future, at locations addressable in a predictable pattern, by the application, storing, in a prefetch engine control register, dependent on information included in the first instruction, data representing an amount of prefetching to be performed and data representing a stride distance between consecutive cache lines to be prefetched, receiving a second instruction for prefetching a single cache line whose location is identified by a parameter of the second instruction, and initiating, in response to receiving the second instruction, prefetching of multiple cache lines by the programmable hardware prefetch engine, the prefetching to be performed in parallel with execution of the application and in accordance with the data stored in the prefetch engine control register. In combination with any of the above embodiments, the prefetch engine control register may include multiple entries, each of which may include an identifier of a respective operation to prefetch, by the programmable hardware prefetch engine, multiple cache lines, the first instruction may specify an identifier of a given operation to prefetch, by the programmable hardware prefetch engine, multiple cache lines, and the method may further include storing the data representing an amount of prefetching to be performed, the data representing a stride distance between consecutive ones of the multiple cache lines to be prefetched, and the identifier of the given operation in one of the entries, in the prefetch engine control register. In combination with any of the above embodiments, the method may further include storing, in the prefetch engine control register, dependent on information included in the first instruction, data representing a number of execution cycles for which to wait between prefetching consecutives ones of the multiple cache lines. In combination with any of the above embodiments, the method may further include prefetching the multiple cache lines from a last-level cache to a mid-level cache in the processor. In combination with any of the above embodiments, the programmable hardware prefetch engine may include a hardware state machine, and the method may further include prefetching, by the hardware state machine, the multiple cache lines asynchronously and in parallel with the execution of the application. In combination with any of the above embodiments, the method may further include receiving a third instruction for disabling the prefetching of the multiple cache lines by the programmable hardware prefetch engine, and storing, in the prefetch engine control register, in response to receiving the third instruction, data indicating that the programmable hardware prefetch engine is no longer enabled to perform the prefetching of the multiple cache lines. In combination with any of the above embodiments, the first instruction may include a write request that targets the prefetch engine control register. In combination with any of the above embodiments, prefetching the multiple cache lines may be performed asynchronously and in parallel with the execution of the application by a hardware state machine, and the states through which the hardware state machine moves include a disabled state, an enabled state, and a prefetching state. In combination with any of the above embodiments, the data representing an amount of prefetching to be performed may include a value representing the number of prefetches to be performed. In combination with any of the above embodiments, the data representing an amount of prefetching to be performed may include a value representing a maximum total size of the prefetching results. In combination with any of the above embodiments, the method may further include saving, in response to a context switch, the contents of the prefetch engine control register. In combination with any of the above embodiments, the method may further include clearing, in response to a context switch, the contents of the prefetch engine control register. In combination with any of the above embodiments, the information included in the first instruction may include data representing an address at which to begin the prefetching of the multiple cache lines by the programmable hardware prefetch engine. In combination with any of the above embodiments, prefetching the multiple cache lines by the programmable hardware prefetch engine may include prefetching the multiple cache lines beginning on a page boundary. In combination with any of the above embodiments, the method may further include preventing the prefetching of the multiple cache lines by the programmable hardware prefetch engine from crossing a page boundary.

Some embodiments of the present disclosure include a system. In at least some embodiments, the system may include a processor, the processor including a programmable hardware prefetch engine, and a prefetch engine control register. The system may also include a memory storing program instructions that, when executed by the processor, implement an application. The program instructions may include a first instruction executable to configure the programmable hardware prefetch engine for prefetching multiple cache lines to be accessed in the future, at locations addressable in a predictable pattern, by the application, and a second instruction executable to prefetch a single cache line whose location is identified by a parameter of the first instruction. The system may further include circuitry to receive, during execution of the application, the first instruction, to store, in the prefetch engine control register, dependent on information included in the first instruction, data representing an amount of prefetching to be performed and data representing a stride distance between consecutive cache lines to be prefetched, to receive the second instruction, and to initiate, in response to receiving the second instruction, prefetching of multiple cache lines by the programmable hardware prefetch engine, the prefetching to be performed in parallel with execution of the application and in accordance with the data stored in the prefetch engine control register. In combination with any of the above embodiments, the first instruction may include a write request that targets the prefetch engine control register. In combination with any of the above embodiments, the prefetch engine control register may include multiple entries, each of which may include an identifier of a respective operation to prefetch, by the programmable hardware prefetch engine, multiple cache lines, the first instruction may specify an identifier of a given operation to prefetch, by the programmable hardware prefetch engine, multiple cache lines, and the system may further include circuitry to store the data representing an amount of prefetching to be performed, the data representing a stride distance between consecutive ones of the multiple cache lines to be prefetched, and the identifier of the given operation in one of the entries, in the prefetch engine control register. In combination with any of the above embodiments, the system may further include circuitry to store, in the prefetch engine control register, dependent on information included in the first instruction, data representing a number of execution cycles for which to wait between prefetching consecutives ones of the multiple cache lines. In combination with any of the above embodiments, the programmable hardware prefetch engine may include circuitry to prefetch the multiple cache lines from a last-level cache to a mid-level cache in the system. In combination with any of the above embodiments, the programmable hardware prefetch engine may include a hardware state machine to prefetch the multiple cache lines asynchronously and in parallel with the execution of the application. In combination with any of the above embodiments, the programmable hardware prefetch engine may include a hardware state machine to prefetch the multiple cache lines asynchronously and in parallel with the execution of the application, and the states through which the hardware state machine moves include a disabled state, an enabled state, and a prefetching state. In combination with any of the above embodiments, the program instructions may further include a third instruction executable to disable the prefetching of the multiple cache lines by the programmable hardware prefetch engine, and the system may further include circuitry to store, in the prefetch engine control register in response to receipt of the first instruction, data indicating that the programmable hardware prefetch engine is enabled to perform the prefetching of the multiple cache lines, to receive the third instruction, and to store, in the prefetch engine control register in response to receipt of the third instruction, data indicating that the programmable hardware prefetch engine is no longer enabled to perform the prefetching of the multiple cache lines. In combination with any of the above embodiments, the data representing an amount of prefetching to be performed may include a value representing the number of prefetches to be performed. In combination with any of the above embodiments, the data representing an amount of prefetching to be performed may include a value representing a maximum total size of the prefetching results. In combination with any of the above embodiments, the system may further include circuitry to save, in response to a context switch, the contents of the prefetch engine control register. In combination with any of the above embodiments, the system may further include circuitry to clear, in response to a context switch, the contents of the prefetch engine control register. In combination with any of the above embodiments, the information included in the first instruction may include data representing an address at which to begin the prefetching of the multiple cache lines by the programmable hardware prefetch engine. In combination with any of the above embodiments, the system may further include circuitry to cause the prefetching of the multiple cache lines by the programmable hardware prefetch engine to begin on a page boundary. In combination with any of the above embodiments, the system may further include circuitry to prevent the prefetching of the multiple cache lines by the programmable hardware prefetch engine from crossing a page boundary.

Some embodiments of the present disclosure include a system. In at least some of these embodiments, the system may include means for receiving, during execution of an application on a processor, a first instruction for configuring a programmable hardware prefetch engine for prefetching multiple cache lines to be accessed in the future, at locations addressable in a predictable pattern, by the application, means for storing, in a prefetch engine control register, dependent on information included in the first instruction, data representing an amount of prefetching to be performed and data representing a stride distance between consecutive cache lines to be prefetched, means for receiving a second instruction for prefetching a single cache line whose location is identified by a parameter of the second instruction, and means for initiating, in response to receiving the second instruction, prefetching of multiple cache lines by the programmable hardware prefetch engine, the prefetching to be performed in parallel with execution of the application and in accordance with the data stored in the prefetch engine control register. In combination with any of the above embodiments, the prefetch engine control register may include multiple entries, each of which may include an identifier of a respective operation to prefetch, by the programmable hardware prefetch engine, multiple cache lines, the first instruction may specify an identifier of a given operation to prefetch, by the programmable hardware prefetch engine, multiple cache lines, and the system may further include means for storing the data representing an amount of prefetching to be performed, the data representing a stride distance between consecutive ones of the multiple cache lines to be prefetched, and the identifier of the given operation in one of the entries in the prefetch engine control register. In combination with any of the above embodiments, the system may further include means for storing, in the prefetch engine control register, dependent on information included in the first instruction, data representing a number of execution cycles for which to wait between prefetching consecutives ones of the multiple cache lines. In combination with any of the above embodiments, the system may further include means for prefetching the multiple cache lines from a last-level cache to a mid-level cache in the processor. In combination with any of the above embodiments, the means for prefetching the multiple cache lines may include means for prefetching, by a hardware state machine, the multiple cache lines asynchronously and in parallel with the execution of the application. In combination with any of the above embodiments, the system may further include means for receiving a third instruction for disabling the prefetching of the multiple cache lines by the programmable hardware prefetch engine, and means for storing, in the prefetch engine control register in response to receiving the third instruction, data indicating that the programmable hardware prefetch engine is no longer enabled to perform the prefetching of the multiple cache lines. In combination with any of the above embodiments, the first instruction may include a write request that targets the prefetch engine control register. In combination with any of the above embodiments, the means for prefetching the multiple cache lines may include means for prefetching, by a hardware state machine, the multiple cache lines asynchronously and in parallel with the execution of the application, and the states through which the hardware state machine moves include a disabled state, an enabled state, and a prefetching state. In combination with any of the above embodiments, the data representing an amount of prefetching to be performed may include a value representing the number of prefetches to be performed. In combination with any of the above embodiments, the data representing an amount of prefetching to be performed may include a value representing a maximum total size of the prefetching results. In combination with any of the above embodiments, the system may further include means for saving, in response to a context switch, the contents of the prefetch engine control register. In combination with any of the above embodiments, the system may further include means for clearing, in response to a context switch, the contents of the prefetch engine control register. In combination with any of the above embodiments, the information included in the first instruction may include data representing an address at which to begin the prefetching of the multiple cache lines by the programmable hardware prefetch engine. In combination with any of the above embodiments, the means for prefetching the multiple cache lines by the programmable hardware prefetch engine may include means for prefetching the multiple cache lines beginning on a page boundary. In combination with any of the above embodiments, the means for prefetching the multiple cache lines by the programmable hardware prefetch engine may include means for preventing the prefetching from crossing a page boundary.

Some embodiments of the present disclosure include at least one non-transitory machine readable storage medium, comprising computer-executable instructions stored on the machine readable medium, the instructions readable by a processor. In at least some of these embodiments, the instructions, when read and executed, cause the processor to configure a programmable hardware prefetch engine of the processor for prefetching multiple cache lines to be accessed in the future by an executing application, at locations addressable in a predictable pattern, store, in a prefetch engine control register, data representing an amount of prefetching to be performed and data representing a stride distance between consecutive cache lines to be prefetched and initiate prefetching of multiple cache lines by the programmable hardware prefetch engine, the prefetching to be performed in parallel with execution of the application and in accordance with the data stored in the prefetch engine control register. In combination with any of the above embodiments, the data representing an amount of prefetching to be performed may include a value representing the number of prefetches to be performed. In combination with any of the above embodiments, the data representing an amount of prefetching to be performed may include a value representing a maximum total size of the prefetching results. In combination with any of the above embodiments, a first one of the instructions may specify an identifier of a given operation to prefetch, by the programmable hardware prefetch engine, multiple cache lines, and the instructions may further cause the processor to store the data representing an amount of prefetching to be performed, the data representing a stride distance between consecutive ones of the multiple cache lines to be prefetched, and the identifier of the given operation in one of the entries in the prefetch engine control register. In combination with any of the above embodiments, the instructions may further cause the processor to store, in the prefetch engine control register, dependent on information included in the first instruction, data representing a number of execution cycles for which to wait between prefetching consecutives ones of the multiple cache lines. In combination with any of the above embodiments, the first instruction may include a write request that targets the prefetch engine control register. In combination with any of the above embodiments, the first instruction may include data representing an address at which to begin the prefetching of the multiple cache lines by the programmable hardware prefetch engine. In combination with any of the above embodiments, the instructions may further cause the processor to prefetch the multiple cache lines from a last-level cache to a mid-level cache in the processor. In combination with any of the above embodiments, the programmable hardware prefetch engine may include a hardware state machine, and the instructions may further cause the processor to prefetch, using the hardware state machine, the multiple cache lines asynchronously and in parallel with the execution of the application. In combination with any of the above embodiments, the programmable hardware prefetch engine may include a hardware state machine, and the instructions may further cause the processor to prefetch, using the hardware state machine, the multiple cache lines asynchronously and in parallel with the execution of the application. The states through which the hardware state machine moves may include a disabled state, an enabled state, and a prefetching state. In combination with any of the above embodiments, a second one of the instructions may cause the processor to store, in the prefetch engine control register, data indicating that the prefetch engine is no longer enabled to perform the prefetching of the multiple cache lines. In combination with any of the above embodiments, the instructions may further cause the processor to prefetch the multiple cache lines using the programmable hardware prefetch engine beginning on a page boundary. In combination with any of the above embodiments, the instructions may further cause the processor to prevent the prefetching of the multiple cache lines by the programmable hardware prefetch engine from crossing a page boundary.

What is claimed is:

1. A processor, comprising:
   a programmable memory prefetcher comprising:
      a programmable hardware prefetch engine; and
      a prefetch engine control register;
   wherein the programmable memory prefetcher comprises circuitry and is configured to:
      receive, during execution of an application on the processor, a first instruction executable to configure the programmable hardware prefetch engine for prefetching multiple cache lines to be accessed in the future, at locations addressable in a predictable pattern, by the application;
      store, in the prefetch engine control register, dependent on information included in the first instruction, data representing an amount of prefetching to be performed and data representing a stride distance between consecutive cache lines to be prefetched;
      receive, during execution of the application, a second instruction executable to prefetch a single cache line whose location is identified by a parameter of the second instruction; and
      initiate, in response to receiving the second instruction, prefetching of multiple cache lines by the programmable hardware prefetch engine from a last-level cache to a mid-level cache in the processor, the prefetching to be performed in parallel with execution of the application and in accordance with the data stored in the prefetch engine control register.

2. The processor of claim 1, wherein the first instruction comprises a write request that targets the prefetch engine control register.

3. The processor of claim 1, wherein:
   the prefetch engine control register includes multiple entries, each of which includes an identifier of a respective operation to prefetch, by the programmable hardware prefetch engine, multiple cache lines;
   the first instruction specifies an identifier of a given operation to prefetch, by the programmable hardware prefetch engine, multiple cache lines; and
   the programmable memory prefetcher is further configured to:
      store the data representing an amount of prefetching to be performed, the data representing a stride distance between consecutive ones of the multiple cache lines to be prefetched, and the identifier of the given operation in one of the entries in the prefetch engine control register.

4. The processor of claim 1, wherein the programmable memory prefetcher is further configured to:
   store, in the prefetch engine control register, dependent on information included in the first instruction, data representing a number of execution cycles for which to wait between prefetching consecutives ones of the multiple cache lines.

5. The processor of claim 1, wherein the programmable hardware prefetch engine comprises a hardware state machine to prefetch the multiple cache lines asynchronously and in parallel with the execution of the application.

6. The processor of claim 1, wherein the programmable memory prefetcher is further configured to:
   receive a third instruction executable to disable the prefetching of the multiple cache lines by the programmable hardware prefetch engine; and
   store, in the prefetch engine control register in response to receiving the third instruction, data indicating that the programmable hardware prefetch engine is no longer enabled to perform the prefetching of the multiple cache lines.

7. The processor of claim 1, wherein the prefetching is to be performed by iteratively prefetching a next cache line at a distance from a previously prefetched cache line specified by the stride distance until the amount of data prefetched matches the amount of prefetching to be performed.

8. A method comprising, in a processor:
   receiving, during execution of an application on the processor, a first instruction for configuring a programmable hardware prefetch engine for prefetching multiple cache lines to be accessed in the future, at locations addressable in a predictable pattern, by the application;
   storing, in a prefetch engine control register, dependent on information included in the first instruction, data representing an amount of prefetching to be performed and data representing a stride distance between consecutive cache lines to be prefetched;

receiving, during execution of the application, a second instruction for prefetching a single cache line whose location is identified by a parameter of the second instruction; and initiating, in response to receiving the second instruction, prefetching of multiple cache lines by the programmable hardware prefetch engine from a last-level cache to a mid-level cache in the processor, the prefetching to be performed in parallel with execution of the application and in accordance with the data stored in the prefetch engine control register.

9. The method of claim 8, wherein:

the prefetch engine control register includes multiple entries, each of which includes an identifier of a respective operation to prefetch, by the programmable hardware prefetch engine, multiple cache lines;

the first instruction specifies an identifier of a given operation to prefetch, by the programmable hardware prefetch engine, multiple cache lines; and the method further includes:

storing the data representing an amount of prefetching to be performed, the data representing a stride distance between consecutive ones of the multiple cache lines to be prefetched, and the identifier of the given operation in one of the entries, in the prefetch engine control register.

10. The method of claim 8, further comprising:

storing, in the prefetch engine control register, dependent on information included in the first instruction, data representing a number of execution cycles for which to wait between prefetching consecutives ones of the multiple cache lines.

11. The method of claim 8, wherein:

the programmable hardware prefetch engine comprises a hardware state machine; and the method further comprises prefetching, by the hardware state machine, the multiple cache lines asynchronously and in parallel with the execution of the application.

12. The method of claim 8, further comprising:

receiving a third instruction for disabling the prefetching of the multiple cache lines by the programmable hardware prefetch engine;

storing, in the prefetch engine control register in response to receiving the third instruction, data indicating that the programmable hardware prefetch engine is no longer enabled to perform the prefetching of the multiple cache lines.

13. A system, comprising:

a processor, comprising a programmable memory prefetcher that includes:

a programmable hardware prefetch engine; and a prefetch engine control register; and a memory storing program instructions that, when executed by the processor, implement an application, the program instructions comprising:

a first instruction executable to configure the programmable hardware prefetch engine for prefetching multiple cache lines to be accessed in the future, at locations addressable in a predictable pattern, by the application; and a second instruction executable to prefetch a single cache line whose location is identified by a parameter of the first instruction;

wherein the programmable memory prefetcher comprises circuitry and is configured to:

receive, during execution of the application, the first instruction;

store, in the prefetch engine control register, dependent on information included in the first instruction, data representing an amount of prefetching to be performed and data representing a stride distance between consecutive cache lines to be prefetched;

receive, during execution of the application, the second instruction; and initiate, in response to receiving the second instruction, prefetching of multiple cache lines by the programmable hardware prefetch engine from a last-level cache to a mid-level cache in the processor, the prefetching to be performed in parallel with execution of the application and in accordance with the data stored in the prefetch engine control register.

14. The system of claim 13, wherein the first instruction comprises a write request that targets the prefetch engine control register.

15. The system of claim 13, wherein:

the prefetch engine control register includes multiple entries, each of which includes an identifier of a respective operation to prefetch, by the programmable hardware prefetch engine, multiple cache lines;

the first instruction specifies an identifier of a given operation to prefetch, by the programmable hardware prefetch engine, multiple cache lines; and the programmable memory prefetcher is further configured to:

store the data representing an amount of prefetching to be performed, the data representing a stride distance between consecutive ones of the multiple cache lines to be prefetched, and the identifier of the given operation in one of the entries in the prefetch engine control register.

16. The system of claim 13, wherein the programmable memory prefetcher is further configured to:

store, in the prefetch engine control register, dependent on information included in the first instruction, data representing a number of execution cycles for which to wait between prefetching consecutives ones of the multiple cache lines.

17. The system of claim 13, wherein the programmable hardware prefetch engine comprises a hardware state machine to prefetch the multiple cache lines asynchronously and in parallel with the execution of the application.

18. The system of claim 13, wherein:

the program instructions further include a third instruction executable to disable the prefetching of the multiple cache lines by the programmable hardware prefetch engine; and the programmable memory prefetcher is further configured to:

store, in the prefetch engine control register in response to receiving the first instruction, data indicating that the programmable hardware prefetch engine is enabled to perform the prefetching of the multiple cache lines;

receive the third instruction; and store, in the prefetch engine control register in response to receiving the third instruction, data indicating that the programmable hardware prefetch engine is no longer enabled to perform the prefetching of the multiple cache lines.

* * * * *